(12) United States Patent
Furukawa

(10) Patent No.: US 11,195,322 B2
(45) Date of Patent: Dec. 7, 2021

(54) IMAGE PROCESSING APPARATUS, SYSTEM THAT GENERATES VIRTUAL VIEWPOINT VIDEO IMAGE, CONTROL METHOD OF IMAGE PROCESSING APPARATUS AND STORAGE MEDIUM

(71) Applicant: CANON KABUSHIKI KAISHA, Tokyo (JP)

(72) Inventor: Takeshi Furukawa, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/842,047

(22) Filed: Apr. 7, 2020

(65) Prior Publication Data
US 2020/0327724 A1 Oct. 15, 2020

(30) Foreign Application Priority Data
Apr. 11, 2019 (JP) .............................. JP2019-075362

(51) Int. Cl.
*G06T 15/20* (2011.01)
*G06T 7/194* (2017.01)
*G06T 7/11* (2017.01)
*G06T 17/00* (2006.01)
*H04N 13/117* (2018.01)
*H04N 13/243* (2018.01)
*G06T 7/593* (2017.01)
(Continued)

(52) U.S. Cl.
CPC ........ *G06T 15/205* (2013.01); *G06T 2200/24* (2013.01)

(58) Field of Classification Search
None
See application file for complete search history.

(56) References Cited

U.S. PATENT DOCUMENTS

2013/0321593 A1* 12/2013 Kirk ..................... H04N 13/243
348/51
2019/0089942 A1 3/2019 Hanamoto
(Continued)

FOREIGN PATENT DOCUMENTS

JP 2018067106 A 4/2018

OTHER PUBLICATIONS

Tu, Segmentation of sows in farrowing pens, IET Image Processing, vol. 8, Iss. 1 p. 56-68, 2014 (Year: 2014).*
(Continued)

*Primary Examiner* — Yingchun He
(74) *Attorney, Agent, or Firm* — Rossi, Kimms & McDowell LLP

(57) ABSTRACT

To prevent an object that should exist in a virtual viewpoint video image from disappearing. The image processing apparatus generates three-dimensional shape data on a moving object from images based on image capturing from a plurality of viewpoints and outputs the data to the apparatus that generates a virtual viewpoint video image. Then, in a case where it is not possible to generate three-dimensional shape data on an object that behaves as the moving object during a part of the period of the image capturing, three-dimensional shape data on the object generated in the past is output to the apparatus that generates a virtual viewpoint video image.

20 Claims, 13 Drawing Sheets

(51) Int. Cl.
*H04N 13/111* (2018.01)
*H04N 13/00* (2018.01)

(56) References Cited

U.S. PATENT DOCUMENTS

2019/0098278 A1 3/2019 Koizumi
2020/0349367 A1* 11/2020 Sasaki .................. G06T 15/205

OTHER PUBLICATIONS

Extended European Search Report issued in European Appln. No. 20168931.2 dated Sep. 2, 2020.

* cited by examiner

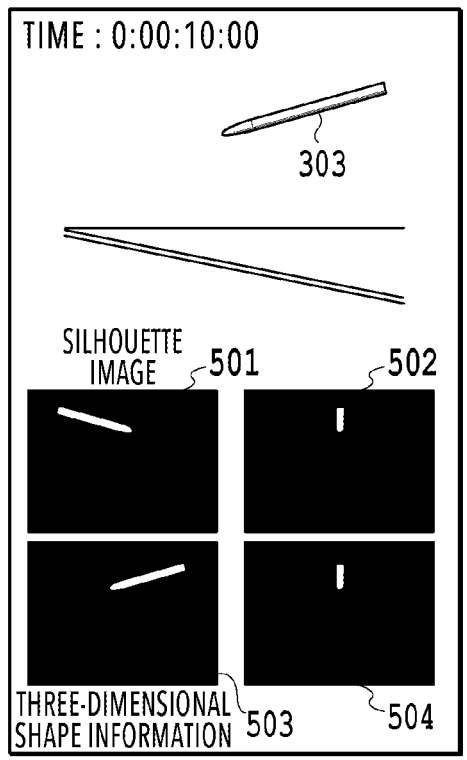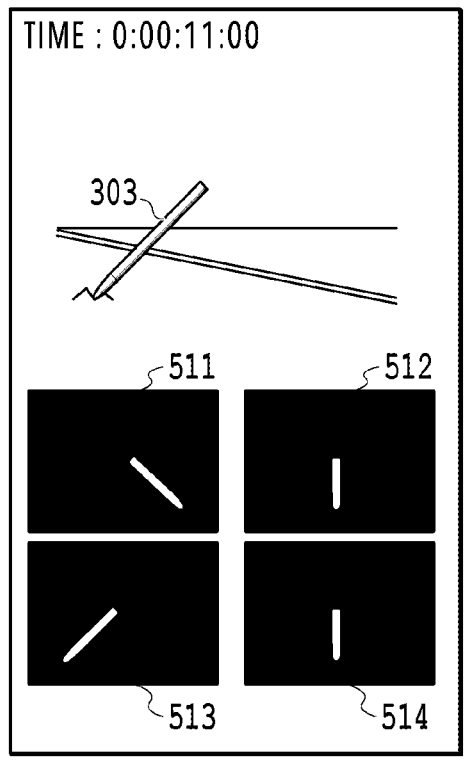
FIG.5A    FIG.5B
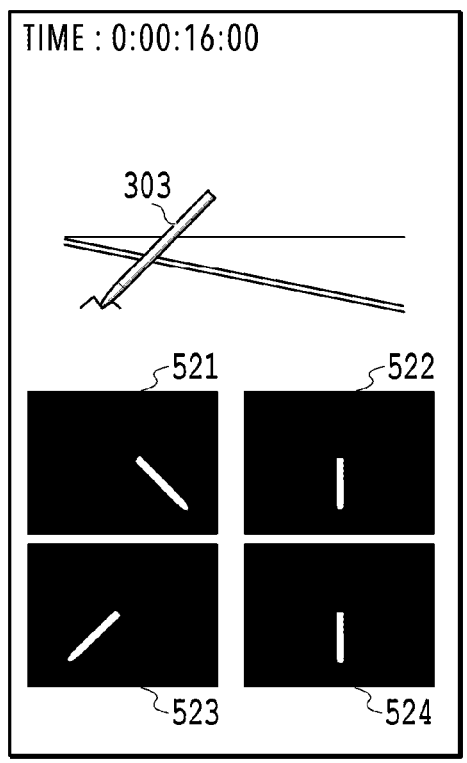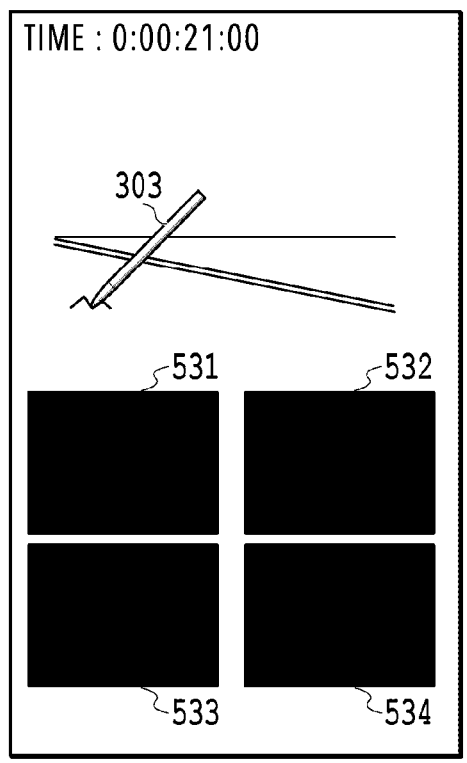
FIG.5C    FIG.5D

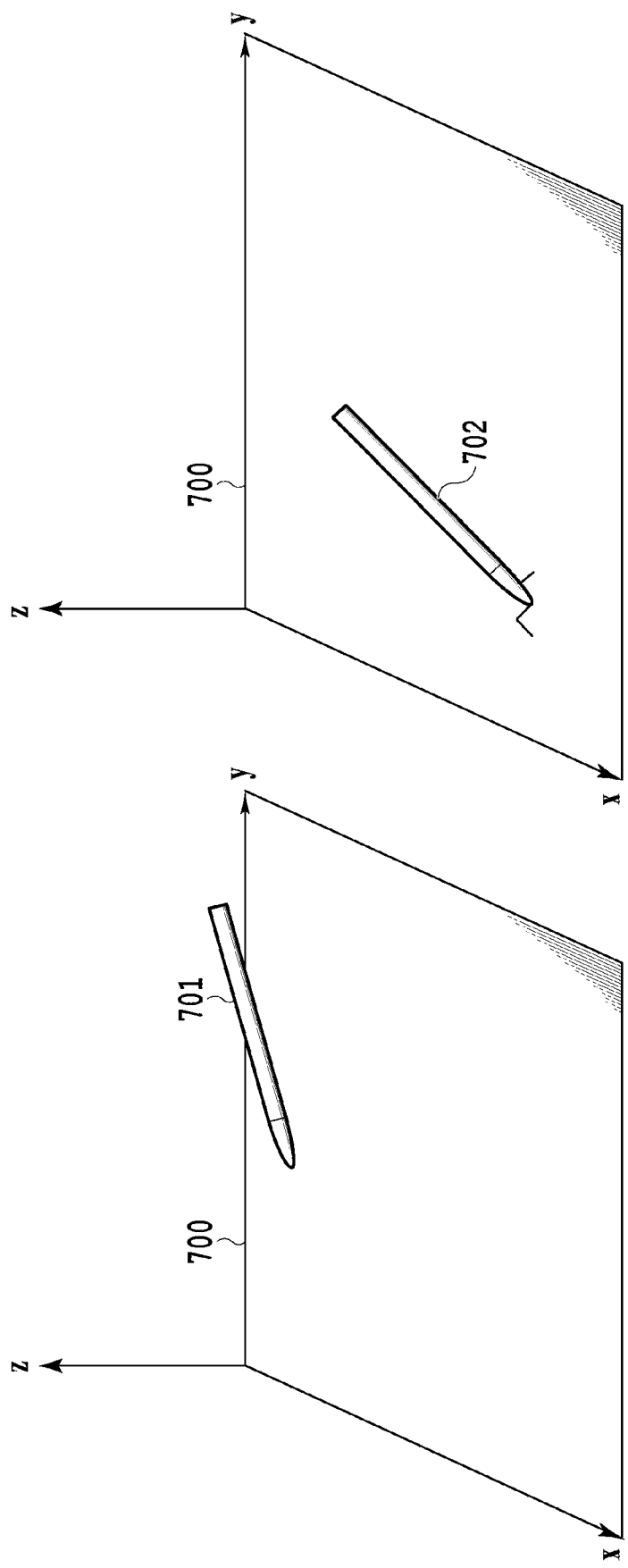

| TIME | DATA ID | 3D BOUNDING BOX COORDINATE INFORMATION | VOXEL DATA |
|---|---|---|---|
| 0:00:10:00 | — | — | — |
| 0:00:11:00 | — | — | — |
| 0:00:16:00 | 001 | COORDINATES OF VERTEXES A' TO H' | VOXEL GROUP 702 |
| 0:00:21:00 | 001 | COORDINATES OF VERTEXES A' TO H' | VOXEL GROUP 702 |

FIG.9

IMAGE PROCESSING APPARATUS, SYSTEM THAT GENERATES VIRTUAL VIEWPOINT VIDEO IMAGE, CONTROL METHOD OF IMAGE PROCESSING APPARATUS AND STORAGE MEDIUM

BACKGROUND

Field

The technique of the present disclosure relates to an image processing technique.

Description of the Related Art

In recent years, a technique called a virtual viewpoint video image has been attracting attention, in which an object can be viewed as a video image that captures the object from a variety of viewpoints and angles. According to this virtual viewpoint video image, for example, it is possible to view a highlight scene of soccer or basketball from a variety of angles, and therefore, it is possible to give a user a high feeling of being at a live performance compared to a normal video image. The virtual viewpoint video image such as this is generated from video images captured from a number of directions at the same timing by using a plurality of cameras installed so as to surround an object.

As disclosed in Japanese Patent Laid-Open No. 2018-67106, normally, at the time of the generation of a virtual viewpoint video image, first, three-dimensional shape data representing the three-dimensional shape of an object existing in the image capturing scene is generated. Specifically, a silhouette image obtained by extracting the silhouette of an object is generated by performing foreground/background segmentation processing to segment into the object that is the foreground and the other background by taking each frame (still image) of the video images captured by a plurality of cameras as a target. Then, from the obtained silhouette image, three-dimensional shape data representing the three-dimensional shape of the object is generated. Then, a video image representing an appearance from a virtual viewpoint is obtained based on information on the virtual viewpoint specified by a user and the three-dimensional shape data.

Here, for the generation of a silhouette image, the background difference method, the inter-frame difference method, or the like is used. Then, as regards the background difference method, a technique is known that makes it also possible to deal with a change in the background due to a change in the illumination condition or the like by updating the background based on a newly captured video image.

In a case where a silhouette image is generated by using the background difference method in which the updating of the background as described above is performed, the object that does not move for a predetermined time is identified as the background and it is handled as a part of the background afterward, and therefore, the silhouette image is no longer generated. In a case where the silhouette image is no longer obtained, it is no longer possible to generate the three-dimensional shape data on an object that does not move. Then, the virtual viewpoint video image is not generated based on the three-dimensional shape data, and therefore, the object that has existed so far in the virtual viewpoint video image suddenly disappears as a result.

Consequently, an object of the technique of the present disclosure is to prevent an object that should exist in a virtual viewpoint video image from disappearing suddenly.

SUMMARY

The image processing apparatus according to the present disclosure is an image processing apparatus that outputs three-dimensional shape data representing a shape of an object to an apparatus that generates a virtual viewpoint video image and includes: a first generation unit configured to generate three-dimensional shape data on a moving object from images based on image capturing from a plurality of viewpoints; and an output unit configured to output three-dimensional shape data generated by the first generation unit to the apparatus that generates a virtual viewpoint video image, and the first generation unit generates three-dimensional shape data on an object that behaves as a moving object during a part of a period of the image capturing and the output unit outputs, based on that it is not possible for the first generation unit to generate three-dimensional shape data on an object that behaves as a moving object during a part of a period of the image capturing, three-dimensional shape data on the object generated in the past to the apparatus that generates a virtual viewpoint video image.

Further features of the present disclosure will become apparent from the following description of exemplary embodiments with reference to the attached drawings.

BRIEF DESCRIPTION OF THE DRAWINGS

FIG. 5A to FIG. 5D are diagrams explaining the reason a three-dimensional model of a motionless object is no longer generated;

FIG. 7A and FIG. 7B are each a diagram showing a three-dimensional shape of a javelin;

FIG. 9 is a diagram showing an example of a management table at the time of saving three-dimensional shape data;

DESCRIPTION OF THE EMBODIMENTS

Hereinafter, with reference to the attached drawings, the present disclosure is explained in detail in accordance with the preferred embodiments. Configurations shown in the following embodiments are merely exemplary and the present disclosure is not limited to the configurations shown schematically.

First Embodiment

Figure 1:
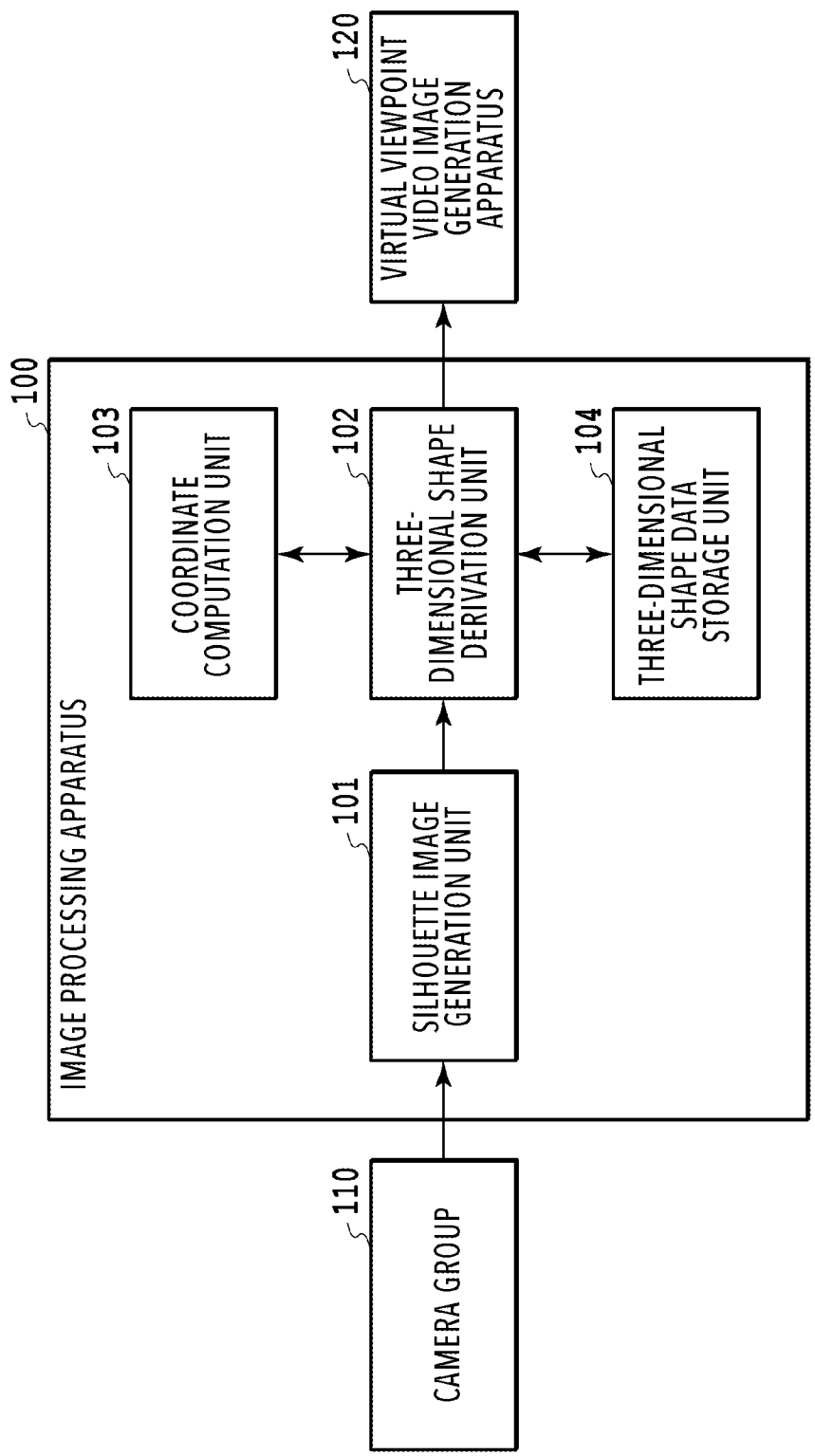
FIG. 1 is a diagram showing an example of a configuration of a virtual viewpoint video image system according to a first embodiment.

FIG. 1 is a diagram showing an example of the configuration of a virtual viewpoint video image system in the present embodiment. The virtual viewpoint video image is a video image generated by an end user and/or an appointed operator or the like freely operating the position and orientation of a virtual viewpoint (virtual camera that does not exist actually) and also called a free-viewpoint video image, an arbitrary viewpoint video image, and the like. The virtual viewpoint video image system shown in FIG. 1 has an image processing apparatus 100, a camera group 110, and a virtual viewpoint video image generation apparatus 120.

The image processing apparatus 100 receives video image data from the camera group 100. This video image data is data on video images captured from a plurality of different viewpoints (hereinafter, called "multi-viewpoint video image"). Then, from the received multi-viewpoint video image data, data (three-dimensional shape data, hereinafter, also described as "three-dimensional model") representing the three-dimensional shape of an object and information (hereinafter, called "texture information") representing the color and texture of an object are generated. The three-dimensional model and the texture information, which are generated, are sent to the virtual viewpoint video image generation apparatus 120. The texture information that is transmitted has at least one of color information, luminance information, and saturation information, on the surface of the object. The texture information may be transmitted in the form of a captured image or a foreground image, or may be transmitted in the form of a texture image in which each element configuring the three-dimensional model is associated with the texture information in correspondence to the three-dimensional model.

The camera group 1N includes a plurality of digital video cameras (hereinafter, digital video camera is described simply as "camera"). Each camera comprises a video image signal interface represented by the serial digital interface (SDI) and outputs video image data captured by each camera to the image processing apparatus 100 via the video image signal interface.

The virtual viewpoint video image generation apparatus 120 generates a virtual viewpoint video image representing the appearance from the virtual viewpoint specified by a user by performing rendering processing using the three-dimensional model and the texture information, which are received from the image processing apparatus 100. It is assumed that the three-dimensional model of the present embodiment is input to the virtual viewpoint video image generation apparatus 120 in the state where a voxel group as an element group representing the three-dimensional shape of an object is arranged on a three-dimensional space as the virtual viewpoint video image space. Then, it is assumed that in rendering processing, a virtual viewpoint video image is obtained by performing processing to paste a texture to the surface of the three-dimensional shape of the object represented by the three-dimensional model in accordance with the virtual viewpoint information that is input separately. The generated virtual viewpoint video image data is output and displayed on a display device, not shown schematically, represented by a liquid crystal display or the like, and a user is provided with a view of the virtual viewpoint video image data.

In the virtual viewpoint information, at least information relating to the position and the gaze direction of the virtual viewpoint is included. Further, in the specification of the virtual viewpoint, at least the specification relating to the position and the gaze direction of the virtual viewpoint is included. Furthermore, the specification of the virtual viewpoint may not be the specification by a user. For example, the configuration may be such that an apparatus automatically specifies the virtual viewpoint.

(Hardware Configuration of Image Processing Apparatus)

Figure 2:
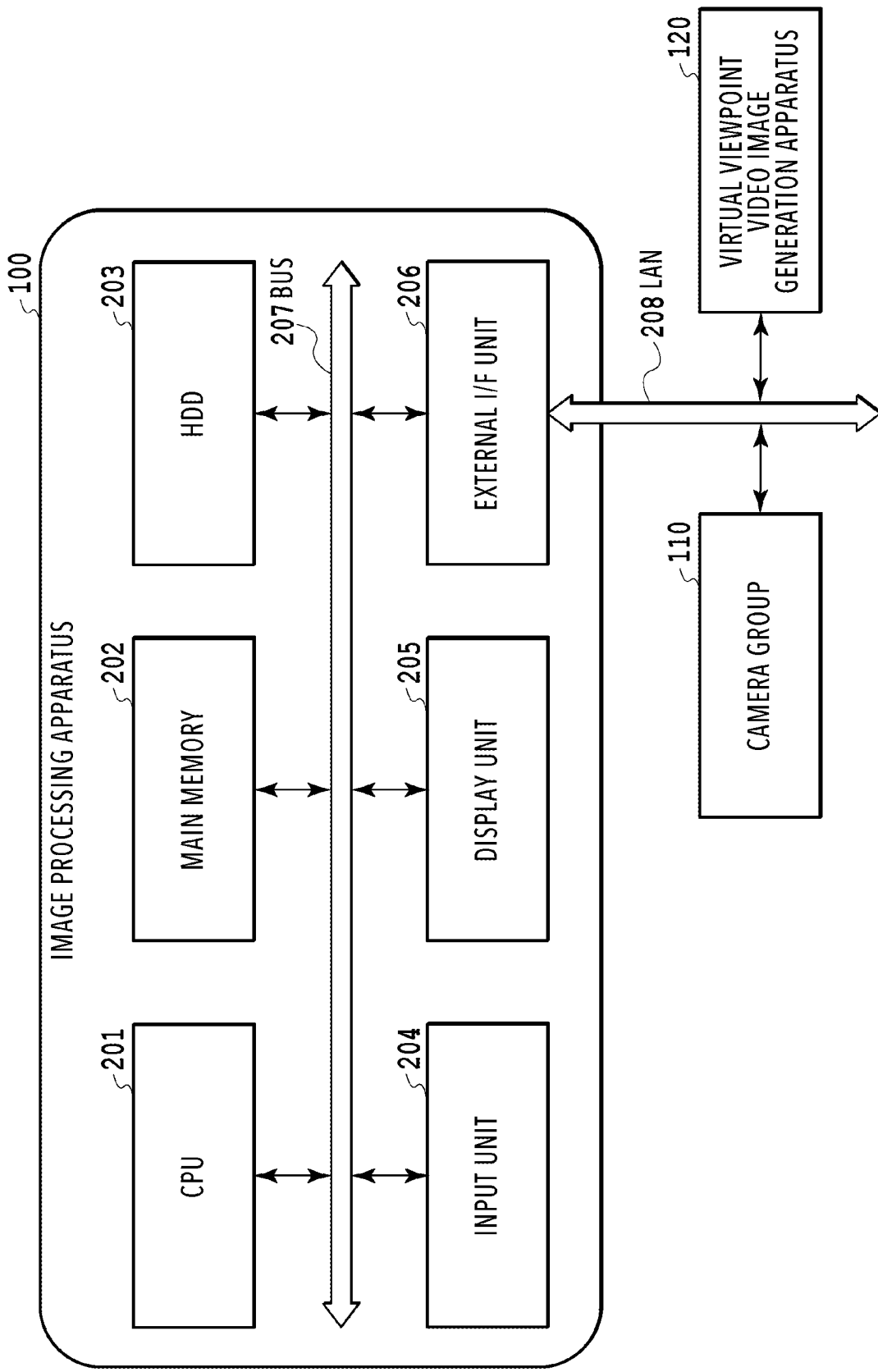
FIG. 2 is a diagram showing an example of a hardware configuration of an image processing apparatus.

FIG. 2 is a diagram showing an example of the hardware configuration of the image processing apparatus 100. The image processing apparatus 100 comprises a CPU 201, a main memory 202, an HDD 203, an input unit 204, a display unit 205, and an external I/F 206 and each unit is connected via a bus 207. First, the CPU 201 is a central processing unit configured to centralizedly control the image processing apparatus 100 and performs a variety kinds of image processing, to be described later, by executing various programs stored in the HDD 203 and the like. The main memory 202 provides a work area to the CPU 201 as well as temporarily storing data, parameters, and the like, which are used in various kinds of processing. The HDD 203 is a nonvolatile large-capacity storage device that stores various programs, input video image data, and the like, and the HDD 203 may be, for example, an SSD or the like. The input unit 204 is a device, such as a keyboard, a mouse, an electronic pen, a touch-sensitive panel, and the like, and receives a variety of user instructions. The display unit 205 includes a liquid crystal panel and the like, and displays a UT (User Interface) screen, and so on. The external I/F unit 206 is a communication interface that performs transmission and reception of various kinds of data, such as multi-viewpoint video image data and three-dimensional models, with each camera configuring the camera group 110 and the virtual viewpoint video image generation apparatus 120 via a network (here, LAN 208). The bus 207 connects each unit described above and performs data transfer.

The virtual viewpoint video image generation apparatus 120 also comprises the same configuration as that of the image processing apparatus 100 and performs the above-described rendering processing and the like using the CPU and the main memory.

(Software Configuration of Image Processing Apparatus)

Next, with reference to FIG. 1 described previously, the software configuration of the image processing apparatus 100 is explained. In FIG. 1, within the frame indicating the image processing apparatus 100, four function units, that is, a silhouette image generation unit 101, a three-dimensional shape derivation unit 102, a coordinate computation unit 103, and a three-dimensional shape data storage unit 104 are shown. In the following, each unit is explained.

The silhouette image generation unit 101 generates a silhouette image of an object, which is a foreground, by taking the multi-viewpoint video image data that is input from the camera group 110 as a target. The silhouette image is a single-color image representing a two-dimensional shape of an object by filling the inside of the contour of the object and representing each pixel by a binary value. The silhouette image generation unit 101 of the present embodiment obtains a silhouette image by using the background difference method, that is, by finding the difference between each frame (still image) that is input in a time series and the background image prepared in advance and binarizing the difference. Not limited to binarization, any image may be accepted as long as the foreground area is distinguished from the other areas. Further, the silhouette image generation unit 101 updates the background image in a case where the difference from the background is the same contents and this continues for a predetermined time, such as a case where there is a change in the illumination condition. Due to this, it is possible to generate a silhouette image without being affected by the change in the illumination condition and the like. Further, the silhouette image generation unit 101 generates image data as texture information, which represents the color and texture of a two-dimensional shape represented by each generated silhouette image. The silhouette image data and the texture information, which are generated, are input to the three-dimensional shape derivation unit 102.

The three-dimensional shape derivation unit 102 generates three-dimensional shape data by deriving the three-dimensional shape of the object from the silhouette image generated by the silhouette image generation unit 101 and outputs the data to the virtual viewpoint video image generation apparatus 120. The object that is the three-dimensional shape derivation target is a foreground and an object that behaves as a moving object throughout at least a plurality of frames. Then, in a case where it is not possible to generate the three-dimensional shape data on an object that behaves as a moving object during a part of the period of the image capturing of the multi-viewpoint image, the three-dimensional shape derivation unit 102 outputs the three-dimensional shape data on the object generated in the past to the apparatus that generates a virtual viewpoint video image. In the present embodiment, explanation is given by taking the voxel format as an example of the data format of the three-dimensional shape, but the any data format may be accepted as long as the data format can specify the three-dimensional shape of an object, and another data format, such as the point cloud format and the mesh format, may be accepted. For the derivation of a three-dimensional shape, the visual volume intersection method (shape from silhouette method) is used, which is generally used. The visual volume intersection method is a method of obtaining the three-dimensional shape of an object by inversely projecting a plurality of silhouette images obtained from video images captured by a plurality of cameras and whose viewpoints are different onto a three-dimensional space, and finding the intersection portion of each visual volume. Here, in order to simplify explanation, the number of cameras is set to four, but by increasing the number of cameras to increase the number of silhouette images, it is possible to derive a three-dimensional shape with a higher accuracy. Further, the method of deriving a three-dimensional shape is not limited to the visual volume intersection method and it may also be possible to use another method, such as the stereo matching method. Details of the derivation processing of the three-dimensional shape of an object in the present embodiment will be described later.

The coordinate computation unit 103 calculates the three-dimensional coordinates at which the voxel group exists by mapping the voxel group representing the three-dimensional shape of an object, which is derived by the three-dimensional shape derivation unit 102, onto the three-dimensional space coordinates. In the present embodiment, eight vertex coordinates of a cuboid (hereinafter, called "3D bounding box") circumscribing the voxel group are found as the three-dimensional coordinates of the voxel group.

The three-dimensional shape data storage unit 104 performs processing to store three-dimensional shape data in the HDD 203, read specific three-dimensional shape data from the HDD 203, and so on, in accordance with instructions of the three-dimensional shape derivation unit 102.

(Problem)

In the present embodiment, even in a case where a moving object that moves between frames terminates its movement and becomes motionless, it is made possible to supply the three-dimensional shape data on the moving object without interruption to the virtual viewpoint video image generation apparatus 120. Before explaining the specific processing contents for implementing this, where a defect exists is reviewed.

Figure 3:
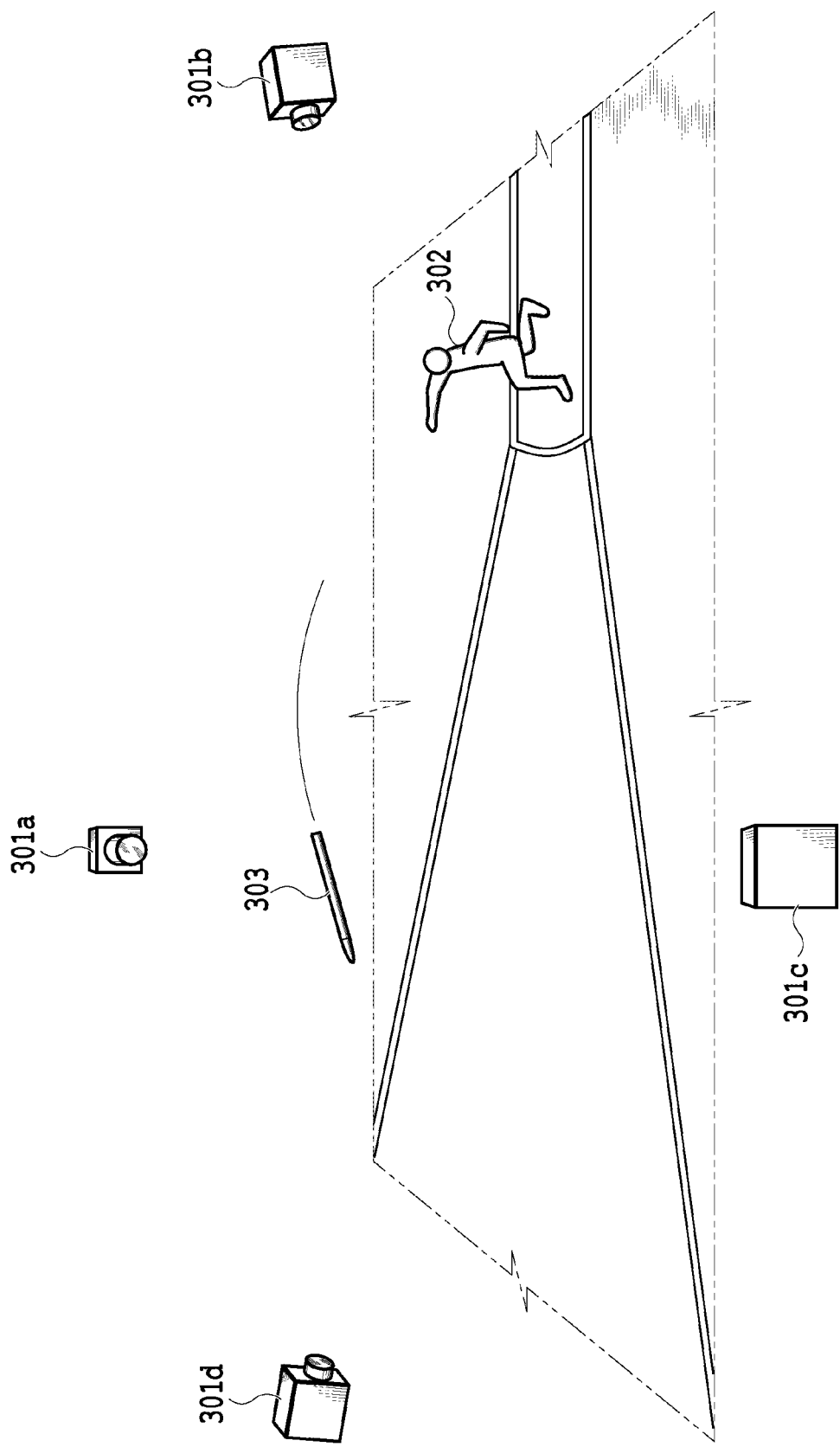
FIG. 3 is a schematic diagram in a case where the way a javelin is thrown is viewed from a bird's eye.
Figure 4:
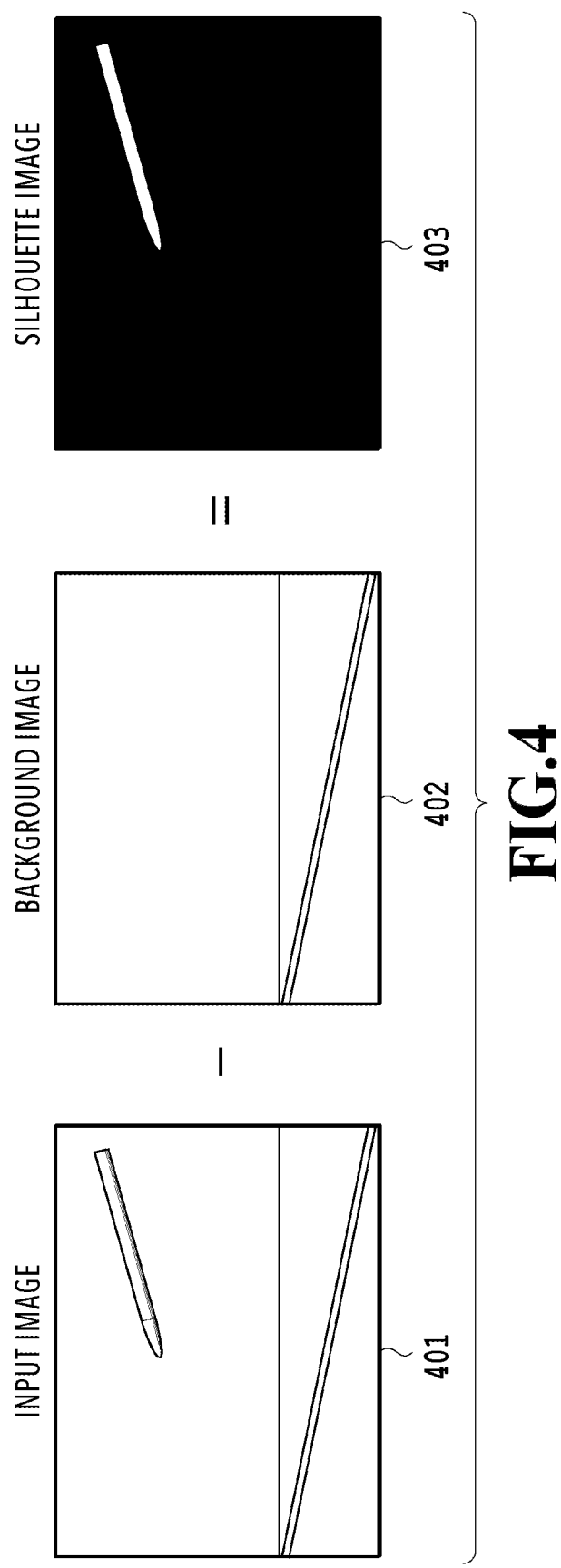
FIG. 4 is a diagram explaining the way a silhouetted image is generated.

Here, explanation is given with reference to FIG. 3 to FIG. 5D by taking a case as an example where the javelin throw, which is one kind of the track and field event, is taken as the image capturing scene. FIG. 3 is a schematic diagram in a case where the way an athlete 302 throws a javelin 303 on a filed 300 is viewed from a bird's eye and around the field 300, four cameras 301a to 301d for obtaining a multi-viewpoint video image, which is the source of a virtual viewpoint video image, are arranged. By each of the four cameras 301a to 301d performing image capturing in synchronization from a different direction, a multi-viewpoint video image is obtained. In a case where each of the cameras 301a to 301d performs image capturing at 60 fps, in the multi-viewpoint video image corresponding to one second, 60×4=240 frames (still images) are included. In FIG. 3, the number of cameras is four, but in an actual environment, such as a stadium in which a track and field event takes place actually, more cameras are arranged. Further. FIG. 4 shows the way a silhouette image of the javelin 303 is generated using a certain frame of a moving image captured by the camera 301c. Here, in an input image 401, the javelin 303 thrown by the athlete 302 is captured. The silhouette image generation unit 101 obtains a silhouette image 403 from the difference between the input image 401 and a background image 402 prepared in advance. Here, as described previously, in the background difference method, in order to deal with a change in the illumination condition or the like, in a case where the difference from the background continues for a predetermined time, the background image is updated. By this updating of the background image, it is no longer possible to generate the three-dimensional model of the object that terminates its movement and becomes motionless. The reason is explained in detail with reference to FIG. 5A to FIG. 5D. In the following explanation, it is assumed that "frame data" is used as that which refers to a set of a plurality of still images captured at the same time and whose viewpoints are different.

In each of FIG. 5A to FIG. 5D, the state of the javelin 303 in the target frame data on the input multi-viewpoint video image is shown at the upper portion and the silhouette image in each state is shown at the lower portion. First, at the upper portion in FIG. 5A corresponding to the frame data at time 0:00:10:00, the javelin 303 thrown by the athlete 302 is in the flying state. Next, in FIG. 5B corresponding to frame data at time 0:00; 11:00 one second after, the javelin 303 is in the state of being pierced into the field 300. Then, in FIG. 5C corresponding to the frame data at time 0:00:16:00 and in FIG. 5D corresponding to the frame data at time 0:00:21:00, the javelin 303 is in the state where the javelin 303 terminates its movement and becomes motionless with the javelin 303 being left pierced into the field 303.

Then, as regards the silhouetted images at the lower portion of each of FIG. 5A to FIG. 5D, first, at time 0:00:10:00, the javelin 303 is in the flying state, and therefore, there is a difference from the background image 402. Because of this, it is possible to derive the silhouette of the javelin 303 and it is possible to obtain silhouette images 501 to 504 each corresponding to the captured image of each of the cameras 301a to 301d. Next, at time 0:00:11 and time 0:00:16:00, the javelin 303 is in the state of being pierced into the field 300 and motionless. Here, in the silhouette image generation processing, it is assumed that the background updating processing is performed, which takes the area in which there is no movement for ten seconds in the input frame data as a new background. In this case, the javelin 303 pierced into the filed 300 and became motionless at time 0:00:11:00, and therefore, the background image 402 is not updated until time 0:00:21:00. Consequently, silhouette images 511 to 514 of the javelin 303 in the state of being pierced and motionless, which each correspond to the captured image of each of the cameras 301a to 301d, are generated for time 0:00:11:00 and similar silhouette images 521 to 524 are generated for time 0:00:16:00. Then, at time 0:00:21:00, ten seconds have elapsed from time 0:00:11:00 at which the javelin 303 became motionless. In this case, the background image is updated to the image of the state where the javelin 303 pierced into the field 300, and therefore, there is no difference between the background image and the captured image of each of the cameras 301a to 301d, and therefore, it is no longer possible to extract the silhouette of the javelin 303. Then, for time 0:00:21:00, silhouette images 531 to 534 in which the silhouette of the javelin 303 does not exist are generated. As a result of that, at time 0:00:10:00, based on the silhouette images 501 to 504, a three-dimensional model representing the shape of the javelin 303 in the flying state is generated. Then, at time 0:00:11:00 and time 0:00:16:00, based on the silhouette images 511 to 514 and the silhouette images 521 to 524, a three-dimensional model representing the shape of the javelin 303 in the state of being pierced into the field 300 is generated, respectively. However, at time 0:00:21:00, the silhouette of the javelin 303 does not exist in the silhouette images 531 to 534, and therefore, a three-dimensional model representing the shape of the javelin 303 is not generated. As a result of that, a defect that the javelin 303 disappears suddenly from the virtual viewpoint video image occurs. This is the problem of the present disclosure.

The above-described problem is not limited to the background difference method. Such a defect that an object that does not move for a predetermined time is handled as the background, not the foreground, and therefore, a desired silhouette image is not obtained may also occur, for example, in the inter-frame difference method. Further, in the present embodiment, explanation is given by taking the "javelin" in the javelin throw as an example of an object that behaves as a moving object during a part of the period of image capturing, but it is possible to apply the present embodiment to a variety of pieces of equipment used in the track and field event. For example, it is also possible to apply the present embodiment similarly to the equipment used in the throwing event other than the javelin throw, for example, the shot and the hammer. Further, it is also possible to apply the present embodiment to the equipment that begins to move from the motionless state, such as the bar used in the jumping event, such as the high jump and the pole vault.

Figure 6:
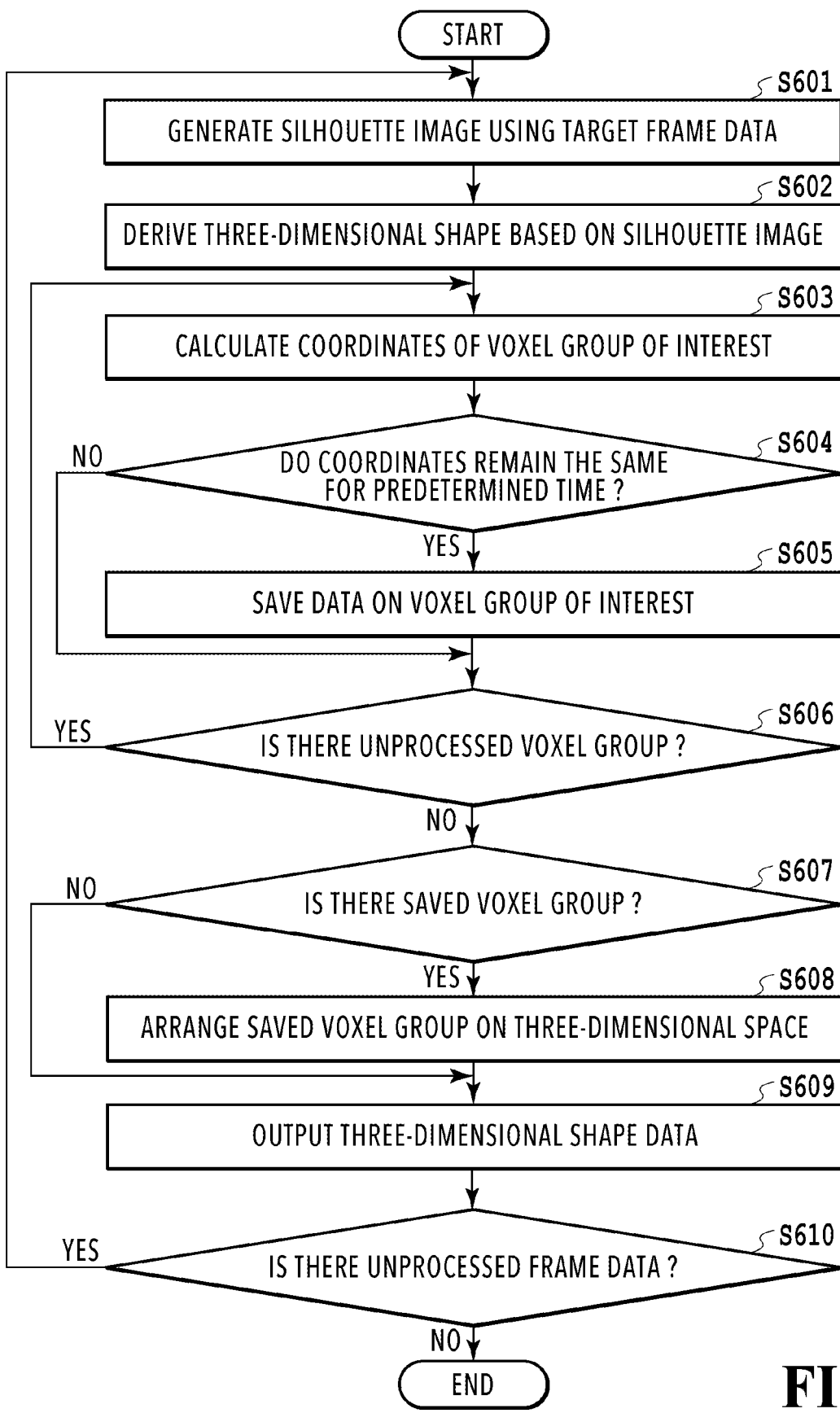
FIG. 6 is a flowchart showing a flow of processing in the image processing apparatus according to the first embodiment.

Following the above, the processing in the image processing apparatus 100 according to the present embodiment is explained with reference to the flowchart in FIG. 6 by taking a case as an example where the frame data at each time shown in FIG. 5A to FIG. 5D described previously is processed. In this case, it is assumed that the javelin 303, which is the object, remains motionless in the state of being pierced into the field 300 in the frames in FIG. 5B to FIG. 5I), that is, for ten seconds from time 0:00:11:00 to time 0:00:21:00. Each piece of processing shown in the flowchart in FIG. 6 is implemented by the CPU 201 reading the control program stored in the HDD 203 onto the main memory 202 and executing the program. In the following explanation, "S" means a step.

<Time 0:00:10:00>

First, at S601, the silhouette image generation unit 101 generates a silhouette image using the processing-target frame data. Here, the silhouette images 501 to 504 including the silhouette of the javelin 303 in the flying state are generated. The data on the generated silhouette images 501 to 504 is input to the three-dimensional shape derivation unit 102.

At S602 that follows, the three-dimensional shape derivation unit 102 derives the three-dimensional shape of the object based on the input silhouette image. FIG. 7A shows the three-dimensional shape data on the javelin 303, which is derived here. The three-dimensional shape data in which a voxel group 701 representing the shape of the javelin 303 in the flying state exists within a three-dimensional space 700, which is the virtual viewpoint video image space, is obtained. The three-dimensional shape data thus obtained is input to the coordinate computation unit 103.

Figures 8A, 8B:
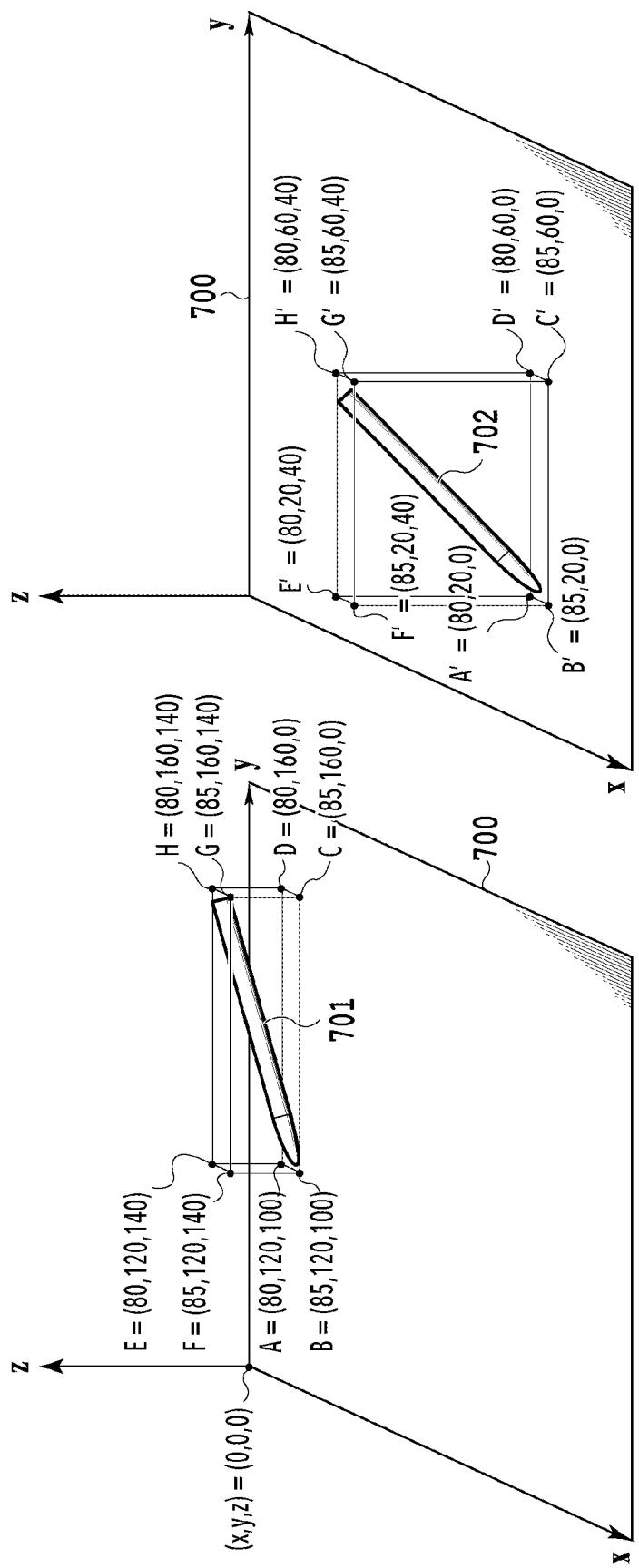
FIG. 8A and FIG. 8B are each a diagram explaining calculation of three-dimensional coordinates of a voxel group.

At S603 that follows, the coordinate computation unit 103 calculates three-dimensional coordinates of a voxel group of interest among all the voxel groups included in the input three-dimensional shape data. Here, by taking the voxel group 701 representing the shape of the javelin 303 as the voxel group of interest, the three-dimensional coordinates thereof are calculated. FIG. 8A shows the three-dimensional coordinates calculated for the voxel group 701 shown in FIG. 7A. The three-dimensional coordinates are information specifying the position of the voxel group 701 by the x-coordinate, the y-coordinate, and the z-coordinate in a case where (x, y, z)=(0, 0, 0) is taken to be the origin in the three-dimensional space 700. Here, the coordinates of eight vertexes A to H of the 3D bounding box circumscribing the voxel group 701 are found. The coordinates of each of the vertexes A to H of the 3D bounding box are found as follows.

First, a minimum coordinate value (x_min) and a maximum coordinate value (x_max) of each axis of the voxel group 701 including a plurality of voxels are found. Here, it is assumed that the minimum coordinate value (x_min) of the x-axis of the voxel group 701=80 and the maximum coordinate value (x_max)=85. Similarly, it is assumed that a minimum coordinate value (y_min) of the y-axis=120 and a maximum coordinate value (y_max)=160, and a minimum coordinate value (z_min) of the z-axis=100 and a maximum coordinate value (z_max)=140. Then, by combining the maximum coordinate value and the minimum coordinate value of each axis, the coordinates of each vertex are obtained. For example, the coordinates of the vertex A are coordinates obtained by combining the minimum coordinate value of each axis, that is, (x_min, y_min, z_min)=(80, 120, 100). Similarly, it is also possible to find the coordinates of the other vertexes B to H and they are summarized as follows.

vertex A: (x_min, y_min, z_min)=(80, 120, 10)
vertex B: (x_max, y_min, z_min)=(85, 120, 100)
vertex C: (x_max, y_max, z_min)=(85, 160, 100)
vertex D: (x_min, y_max, z_min) (80, 160, 100)
vertex E: (x_min, y_min, z_max)=(80, 120, 140)
vertex F: (x_max, y_min, z_max)=(85, 120, 140)
vertex G: (x_max, y_max, z_max)=(85, 160, 140)
vertex H: (x_min, y_max, z_max)=(80, 160, 140)

The information on the three-dimensional coordinates of the voxel group of interest, which are obtained as described above, is input to the three-dimensional shape derivation unit 102.

Next, at S604, the three-dimensional shape derivation unit 102 determines whether the three-dimensional coordinates of the voxel group of interest, which are calculated at S603, remain the same coordinates and do not change for a predetermined time. The predetermined time may be an arbitrary time, but in the present embodiment, the predetermined is taken to be five seconds. The meaning of this determination processing is to check whether the object corresponding to the voxel group of interest remains at the same position and does not move for a time corresponding to a predetermined number of frames. This determination is performed by checking whether the three-dimensional coordinates of the 3D bounding box, which are calculated at S603, remain within a range, which is evaluated as the same coordinates, through a predetermined number of frames before the current frame. Here, at the point in time of time 0:00:10:00, the frame data before that point in time does not exist, and therefore, the comparison-target 3D bounding box does not exist originally. Consequently, it is unlikely that the three-dimensional coordinates of the voxel group 701, which are calculated at S603, remain the same coordinates for a predetermined time. In this case, S605 is skipped and the processing advances to S606.

Next, at S606, whether all the voxel groups have been processed is determined. In a case where the processing of all the voxel groups has been completed, the processing advances to S607. On the other hand, in a case where an unprocessed voxel group exists, the processing returns to S603 and the next voxel group is taken as the target and the same processing is repeated. In the present embodiment, for simplification of explanation, a case where one voxel group exists is taken as an example, and therefore, it is determined that there is no unprocessed voxel group and the processing advances to S607.

At S607 whether there is saved data on the voxel group is determined. Here, S605 is skipped and the data on the voxel group, which was saved before, does not exist, and therefore, S608 is further skipped and the processing advances to S609.

At S609, the three-dimensional shape derivation unit 102 outputs the three-dimensional shape data in which the voxel group representing the shape of the object is arranged within the three-dimensional space, which is the virtual viewpoint video image space, to the virtual viewpoint video image generation apparatus 120. At time 0:00:10:00, the three-dimensional shape data in which the voxel group 701 representing the shape of the javelin 303 in the flying state, which is derived at S602, exists within the three-dimensional space 700 is output.

Then, at S610, whether the processing has been completed for all the frame data is determined. In a case where there is an unprocessed frame, the processing returns to S601 and the processing that takes the next frame data as the target is continued. Here, in order to process the frame data at time 0:00:11:00, the processing returns to S601.

<Time 0:00:11:00>

At S601, the silhouette image generation unit 101 generates a silhouette image using the input target frame data. Here, the silhouette images 511 to 514 including the javelin 303 in the state of being pierced into the field 300 are generated. The data on the generated silhouette images 511 to 514 is input to the three-dimensional shape derivation unit 102.

At S602, the three-dimensional shape derivation unit 102 derives the three-dimensional shape of the object based on the input silhouette images. FIG. 7B shows the three-dimensional shape data on the javelin 303, which is derived here. The three-dimensional shape data in which a voxel group 702 representing the shape of the javelin 303 in the state of being pierced into the field 300 exists within the three-dimensional space 700, which is the virtual viewpoint video image space, is obtained. The three-dimensional shape data thus obtained is input to the coordinate computation unit 103.

At S603, the coordinate computation unit 103 calculates the three-dimensional coordinates of the voxel group of interest among the voxel groups included in the input three-dimensional shape data. Here, by taking the voxel group 702 representing the shape of the javelin 303 in the state of being pierced into the field 300 as the voxel group of interest, the three-dimensional coordinates thereof are calculated. FIG. 8B shows the three-dimensional coordinates calculates for the voxel group 702 shown in FIG. 7B. The three-dimensional coordinates are information specifying the position of the voxel group 702 by the x-coordinate, the y-coordinate, and the z-coordinate in a case where (x, y, z)=(0, 0, 0) is taken as the origin in the three-dimensional space 700. As in FIG. 8A, the coordinates of eight vertexes A' to H' of the 3D bounding box circumscribing the voxel group 702 are found. Here, the coordinates of each of the vertexes A' to H' of the 3D bounding box are as follows.

vertex A': (x_min, y_min, z_min)=(80, 20, 0)
vertex B': (x_max, y_min, z_min)=(85, 20, 0)
vertex C': (x_max, y_max, z_min)=(85, 60, 0)
vertex D': (x_min, y_max, z_min)=(80, 60, 0)
vertex F': (x_min, y_min, z_max)=(80, 20, 40)
vertex F': (x_max, y_min, z_max)=(85, 20, 40)
vertex G': (x_max, y_max, z_max)=(85, 60, 40)
vertex H': (x_min, y_max, z_max) (85, 60, 40)

At S604, the three-dimensional shape derivation unit 102 determines whether the three-dimensional coordinates of the voxel group of interest, which are calculated at S603, remain the same coordinates and do not change for a predetermined time. Here, whether the coordinates of the 3D bounding box circumscribing the voxel group 702 representing the three-dimensional shape of the javelin 303 in the state of being pierced into the field 30 remain the same coordinates and do not change for a predetermined time is determined. Specifically, first, the coordinates of the 3D bounding box at the current point in time (point in time of time 0:00:11:00) and the coordinates of the 3D bounding box at the point in time (point in time of time 0:00:10:00) one second before are compared. Then, whether both the coordinates match with each other is determined. For example, it is assumed that the length of the actual javelin 303 is 260 cm and the voxel length corresponding thereto is 56 voxels. In this case, one voxel length=260 cm/56 voxels=5.2 cm/voxel and movement corresponding to one coordinate of each of x, y, and z will result in movement of 5.2 cm. Here, it is assumed that in a case where the range of movement of the javelin 303 is less than or 5.2 cm, it is determined that the javelin 303 is motionless. In this case, on a condition that the coordinates do not change, it is determined that the coordinates are the same. In a case where it is determined that the javelin 303 is motionless on a condition that the range of movement is less than or equal to 10.4 cm, it is determined that the coordinates are the same in a case where a change in the coordinate is less than or equal to one. As described above, in a case where the difference between the coordinates is included within the range corresponding to the permitted movement, the javelin 303 is handled as that whose coordinates remain the same and do not change. As described previously while the coordinates of the vertex A one second before are (85, 120, 100), the coordinates of the vertex A' at the current point in time are (80, 20, 0), and therefore, both the coordinates to not match with each other. Similarly, the coordinates of each of the vertexes B to H one second before and the coordinates of each of the vertexes B' to H' at the current point in time are largely different. Consequently, it is not determined that the coordinates of the voxel group 702 remain the same coordinates and do not change for a predetermined time. In this case, S605 is skipped and the processing advances to S606.

At S606, whether all the voxel groups have been processed is determined. Here, the one voxel group exists, and therefore, it is determined that there is no unprocessed voxel group and the processing advances to S607.

At S607, whether there is saved data on the voxel group is determined. Here, S605 is skipped and there is no data on the voxel group saved before that, and therefore, S608 is further skipped and the processing advances to S609.

At S609, the three-dimensional shape derivation unit 102 outputs the three-dimensional shape data in which the voxel group representing the shape of the object is arranged within the three-dimensional space, which is the virtual viewpoint video image space, to the virtual viewpoint video image generation apparatus 120. At time 0:00:11:00, the three-dimensional shape data in which the voxel group 702 representing the shape of the javelin 303 in the state of being pierced into the field 300, which is derived at S602, exists within the three-dimensional space 700 is output.

Then, at S610, whether the processing has been completed for all the frame data is determined. In a case where there is an unprocessed frame, the processing returns to S601 and the processing that takes the next frame data as the target is continued. Here, in order to process the frame data at time 0:00:16:00, the processing returns to S601.

<Time 0:00:16:00>

At S601, the silhouette image generation unit 101 generates a silhouette image using the input target frame data. Here, the silhouette images 521 to 524 including the silhouette of the javelin 303 in the state of being pierced into the filed 300 are generated. The data on the generated silhouette images 521 to 524 is output to the three-dimensional shape derivation unit 102.

At S602, the three-dimensional shape derivation unit 102 derives the three-dimensional shape of the object based on the input silhouette images. Here, the javelin 303 is in the state of being pierced into the filed 300, and therefore, the three-dimensional shape data shown in FIG. 7B described previously is obtained. The obtained three-dimensional shape data is input to the coordinate computation unit 103.

At S603, the coordinate computation unit 103 calculates the three-dimensional coordinates of the voxel group of interest among the voxel groups including in the input three-dimensional shape data. Here, as in the case with time 0:00:11:00, the coordinates of the eight vertexes A' to H' of the 3D bounding box circumscribing the voxel group 702 representing the shape of the javelin 303 are found.

At S604, the three-dimensional shape derivation unit 102 determines whether the three-dimensional coordinates of the voxel group of interest, which are calculated at S603, remain the same coordinates and do not change for a predetermined time. Here, whether the coordinates of the 3D bounding box circumscribing the voxel group 702 representing the three-dimensional shape of the javelin 303 in the state of being pierced into the field 300 remain the same coordinates and do not change for a predetermined time is determined. Here, the coordinates of the 3D bounding box are the same as those at time 0:00:11:00 five seconds before. Consequently, it is determined that the coordinates of the voxel group 702 remain the same coordinates and do not change for a predetermined time. In this case, the processing advances to S605.

At S605, the three-dimensional shape data storage unit 104 saves the data on the voxel group of interest in the HDD 203, whose coordinates remain the same for a predetermined time. Here, the data on the voxel group 702 within the 3D bounding box is saved, whose coordinates remain the same coordinates and do not change for five seconds. FIG. 9 shows an example of a saved data management table in the three-dimensional shape data storage unit 104. In the present embodiment, an ID is assigned to each piece of data on the save-target voxel group and the coordinates of the 3D bounding box on the three-dimensional space and the data on the voxel group within the 3D bounding box are stored. Here, as shown in the row of time 0:00:16:00 in the management table in FIG. 9, the coordinate information on the vertex A' to the vertex H' of the 3D bounding box and the data on the voxel group 702 within the 3D bounding box are saved in association with ID "001". The reason the rows of time 0:00:10:00 and time 0:00:11:00 are blank in the table in FIG. 9 is that the data on the voxel group is not saved as described previously.

At S606, whether all the voxel groups have been processed is determined. Here, the one voxel group exists, and therefore, it is determined that there is no unprocessed voxel group and the processing advances to S607.

At S607, whether there is saved data on the voxel group is determined. Here, the data on the voxel group 702 is saved at S65, and therefore, the processing advances to S608. At S608, the three-dimensional shape derivation unit 102 generates three-dimensional shape data to be output to the virtual viewpoint video image generation apparatus 120 by arranging the data on the voxel group saved at S605 on the three-dimensional space, which is the virtual viewpoint video image space. Here, the data on the voxel group 702 is saved, and therefore, the three-dimensional shape derivation unit 102 arranges the data on the voxel group 702 on the three-dimensional space 700 based on the coordinate information on the 3D bounding box saved in association therewith.

At S609, the three-dimensional shape derivation unit 102 outputs the three-dimensional shape data in which the voxel group representing the shape of the object is arranged within the three-dimensional space, which is the virtual viewpoint video image space, to the virtual viewpoint video image generation apparatus 120. At time 0:00:16:00, the three-dimensional shape data generated at S608 is output. At 602 also, the three-dimensional shape data including the voxel group 702 generated from the silhouette image is obtained. However, in the present embodiment, this is not used but the three-dimensional shape data in which the already-saved data, which is managed by the three-dimensional shape data storage unit 104, is read and arranged on the three-dimensional space is output. However, it may also be possible to configure the present embodiment so that the three-dimensional shape data obtained at S602 is output. In this case, it is sufficient to terminate reading of the saved data on the voxel group, which is managed by the three-dimensional shape data storage unit 104, and arrangement onto the three-dimensional space. The termination of reading of the saved data will be described later.

Then, at S610, whether the processing has been completed for all the frame data is determined. In a case where there is an unprocessed frame, the processing returns to S601 and the processing that takes the next frame data as the target is continued. Here, in order to process the frame data at time 0:00:21:00, the processing returns to S601.

<Time 0:00:21:00>

A S601, the silhouette image generation unit 101 generates a silhouette image using the input target frame data. As described previously, in the silhouette image generation processing of the present embodiment, in a case where there is no movement in the input frame data for ten seconds, the updating processing of the background image is performed. That is, at the point in time of time 0:00:21:00, the image in which the javelin 303 is in the state of being pierced into the field 300 is a new background image. Because of this, here, the silhouette images 531 to 534 not including the silhouette of the javelin 303 are generated. In this manner, that data on the silhouette images 531 to 534 without the silhouette of the javelin 303 is input to the three-dimensional shape derivation unit 102.

At S602, the three-dimensional shape derivation unit 102 derives the three-dimensional shape of the object based on the input silhouette images. Here, the silhouette of the javelin 303 does not exist in the input silhouette images. Consequently, the three-dimensional shape data in which the voxel group representing the shape of the javelin 303 does not exist on the three-dimensional space 700 (that is, three-dimensional shape data without contents) is generated.

At S603, the coordinate computation unit 103 calculates the three-dimensional coordinates of the voxel group of interest among the voxel groups included in the input three-dimensional shape data. Here, in the input three-dimensional shape data, the voxel group representing the object shape does not exist. Because of this, the coordinate computing is not performed in the coordinate computation unit 103 and an error signal is output to the three-dimensional shape derivation unit 102.

S604 is processing to determine whether the three-dimensional coordinates of the voxel group of interest, which are calculated at S603, remain the same coordinates and do not change for a predetermined time, but the comparison-target coordinates themselves do not exist originally. In this case, it is not determined that the three-dimensional coordinates remain the same coordinates and do not change for a predetermined time, and therefore, S605 is skipped and the processing advances to S606.

At S606, whether all the voxel groups have been processed is determined. Here, another voxel group does not exist, and therefore, it is determined that there is no unprocessed voxel group and the processing advances to A607.

At S607, whether there is saved data on the voxel group is determined. At the point in time of time 0:00:21:00, the data on the voxel group saved in the frame data processing at time 0:00:16:00 exists. Consequently, the processing advances to S608.

At S608, the three-dimensional shape derivation unit 102 generates three-dimensional shape data to be output to the virtual viewpoint video image generation apparatus 120 by arranging the saved data on the voxel group on the three-dimensional space, which is the virtual viewpoint video image space. That is, as in the case with time 0:00:16:00, the three-dimensional shape data in which the data on the voxel group 702 is arranged on the three-dimensional space 700 is generated.

At S609, the three-dimensional shape derivation unit 102 outputs the three-dimensional shape data in which the voxel group representing the shape of the object is arranged within the three-dimensional space, which is the virtual viewpoint video image space, to the virtual viewpoint video image generation apparatus 120. That is, the three-dimensional shape data generated at S608 is output.

At S610, whether there is unprocessed frame data is determined. In a case where unprocessed frame data is input, the processing returns to S610 and the processing is continued. On the other hand, in a case where there is no frame data to be input and the processing has been completed for all the frame data, this processing is terminated.

The above is the contents of the processing in the image processing apparatus 100 according to the present embodiment (Termination of Reading of Saved Data)

Following the above, a case where reading of saved data on the voxel group is terminated is explained. For example, it is possible to terminate reading of saved data on the voxel group by displaying a predetermined UI screen (not shown schematically) on the display unit 205 and specifying specific data ID or coordinate information on the 3D bounding box. In the example described previously, it is possible to terminate reading of the voxel group data on the javelin 303 by specifying, for example, ID "001". In this case, the three-dimensional shape data in which the voxel group of the javelin 303 does not exist is output, and therefore, the javelin 303 disappears from the virtual viewpoint video image. Further, in a case where it is made possible to input three-dimensional coordinates on the above-described UI screen and there is a 3D bounding box included within/in touch with the space specified by the three-dimensional coordinates specified by a user, it may also be possible to terminate reading of the data on the voxel group corresponding to the 3D bounding box.

In a case where the javelin throw is taken as the image capturing scene described in the present embodiment, at the time of the athlete who throws next changing in accordance with the progress of the event, it is possible to delete the javelin thrown by the previous athlete from the virtual viewpoint video image by a user giving instructions to terminate the above-described reading via the UI screen.

Figure 10:
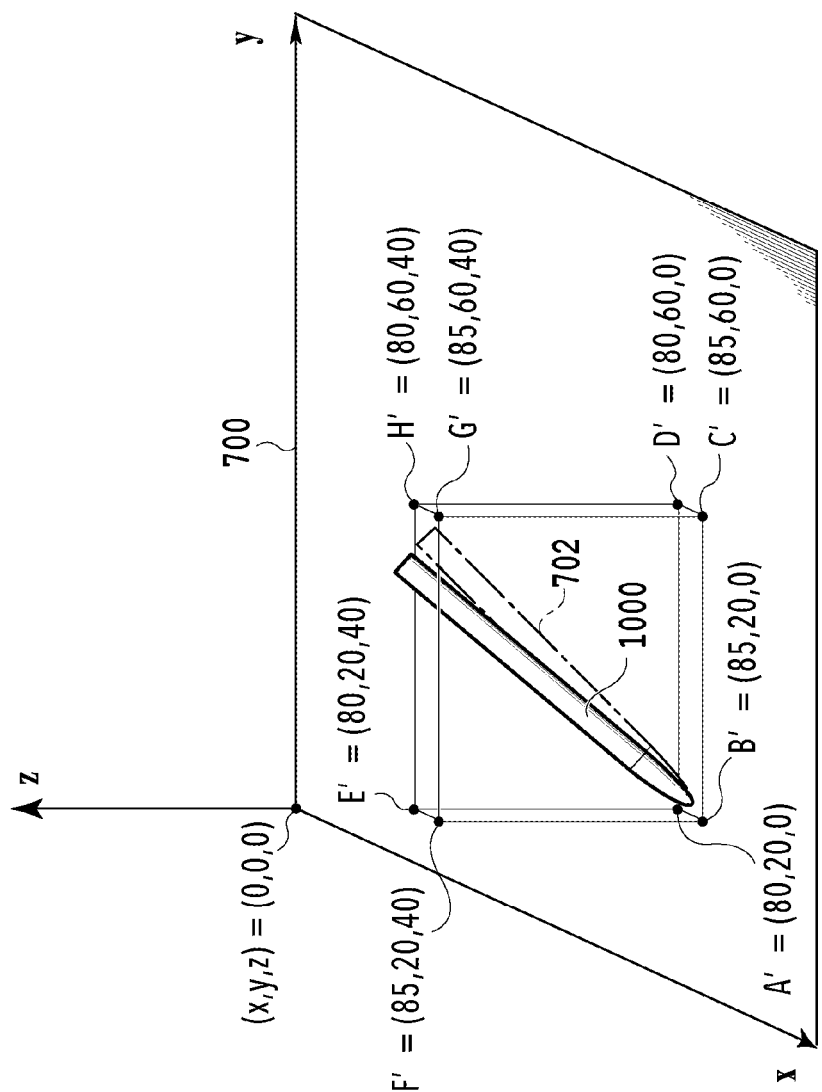
FIG. 10 is a diagram explaining a case where movement of an object resumes.

Further, it may also be possible to terminate reading of saved data based on, for example, the three-dimensional shape derived from the silhouette image in place of user instructions via the UI screen as described above. For example, in a case where a voxel group 1000 representing the shape of the javelin 303 derived from the silhouette image appears within the space indicated by the coordinates A' to H' of the saved 3D bounding box, it may also be possible to terminate reading of the saved data on the voxel group. In this case, on a condition that the javelin 303 that has been motionless so far moves again in the frame data that follows, a silhouette image including the silhouette thereof is generated, and therefore, three-dimensional shape data is generated based on the silhouette image. That is, in a case where the javelin 303 having been in the state of being pierced into the field 300 begins to move again, such as that the javelin 303 falls down, it is possible to generate without fail three-dimensional shape data in which the voxel group 1000 representing the shape of the javelin 303 exists as shown in FIG. 10.

Further, in the silhouette image generation unit 101, the javelin 303 that has been motionless for a predetermined time is stored as the background, and therefore, there is a case where the background corresponding to the area of the javelin 303 is sent as texture information on a condition that the javelin 303 is moved. In a case where the voxel group 1000 representing the shape of the javelin 303 derived from the silhouette image appears within the space indicated by the coordinates A' to H' of the saved 3D bounding box, it may also be possible to perform processing that does not take the saved voxel group as the rendering target. By doing so, it is possible to prevent rendering using an erroneous background texture by not taking the saved voxel group as the rendering target.

After that, in a case where the background is updated as a predetermined time elapses, the silhouette image generation unit 101 no longer transmits the background texture information to the silhouette image of the javelin 303 because the position at which the javelin 303 has been located becomes the field 300.

As described above, according to the present embodiment, even in a case where an object that has been moving becomes motionless and it is no longer possible to generate a silhouette image including the silhouette thereof, it is possible to supply three-dimensional shape data including the voxel group representing the shape of the object to the virtual viewpoint video image generation apparatus 120. As a result of that, in the virtual viewpoint video image generation apparatus 120, it is possible to generate a virtual viewpoint video image in which the motionless object exists.

In the present embodiment, in a case where an object that has been moving becomes motionless, the image processing apparatus 100 stores three-dimensional shape data on the object and outputs the three-dimensional shape data to the virtual viewpoint video image generation apparatus 120 as needed. However, the present embodiment is not limited to this. For example, it may also be possible to input information relating to movement of an object to the virtual viewpoint video image generation apparatus 120, store three-dimensional shape data on the object at the point in time the object becomes motionless, and generate a virtual viewpoint video image by using the stored three-dimensional shape data. The three-dimensional shape data corresponding to the object having become motionless may be saved in the virtual viewpoint video image generation apparatus 120 or may be saved in the image processing apparatus 100. Alternatively, the three-dimensional shape data may be saved in an external device, such as a database. Further, it is also possible to apply the present embodiment to a case where one apparatus having the functions of both the image processing apparatus 100 and the virtual viewpoint video image generation apparatus 120 generates a virtual viewpoint video image from multi-viewpoint video image data.

Further, it may also be possible to always save the generated three-dimensional shape data in the image processing apparatus 100 or an external device (database), acquire information relating to movement of the object, and based on that the object has become motionless, transmit the three-dimensional shape data corresponding to the object having become motionless to the virtual viewpoint video image generation apparatus 120.

Second Embodiment

In the first embodiment, by storing the three-dimensional model of an object that does not move and is motionless for a predetermined time, it is made possible to continue the supply of the three-dimensional model even in a case where the silhouette image of the object is no longer generated. Next, an aspect is explained as a second embodiment in which the silhouette image of an object that does not move and is motionless for a predetermined time is stored and it is made possible to derive the three-dimensional shape of the object also after the object becomes motionless. Explanation of the contents in common to those of the first embodiment, such as the hardware configuration of the image processing apparatus, is omitted or simplified and in the following, different points are explained mainly.

Figure 11:
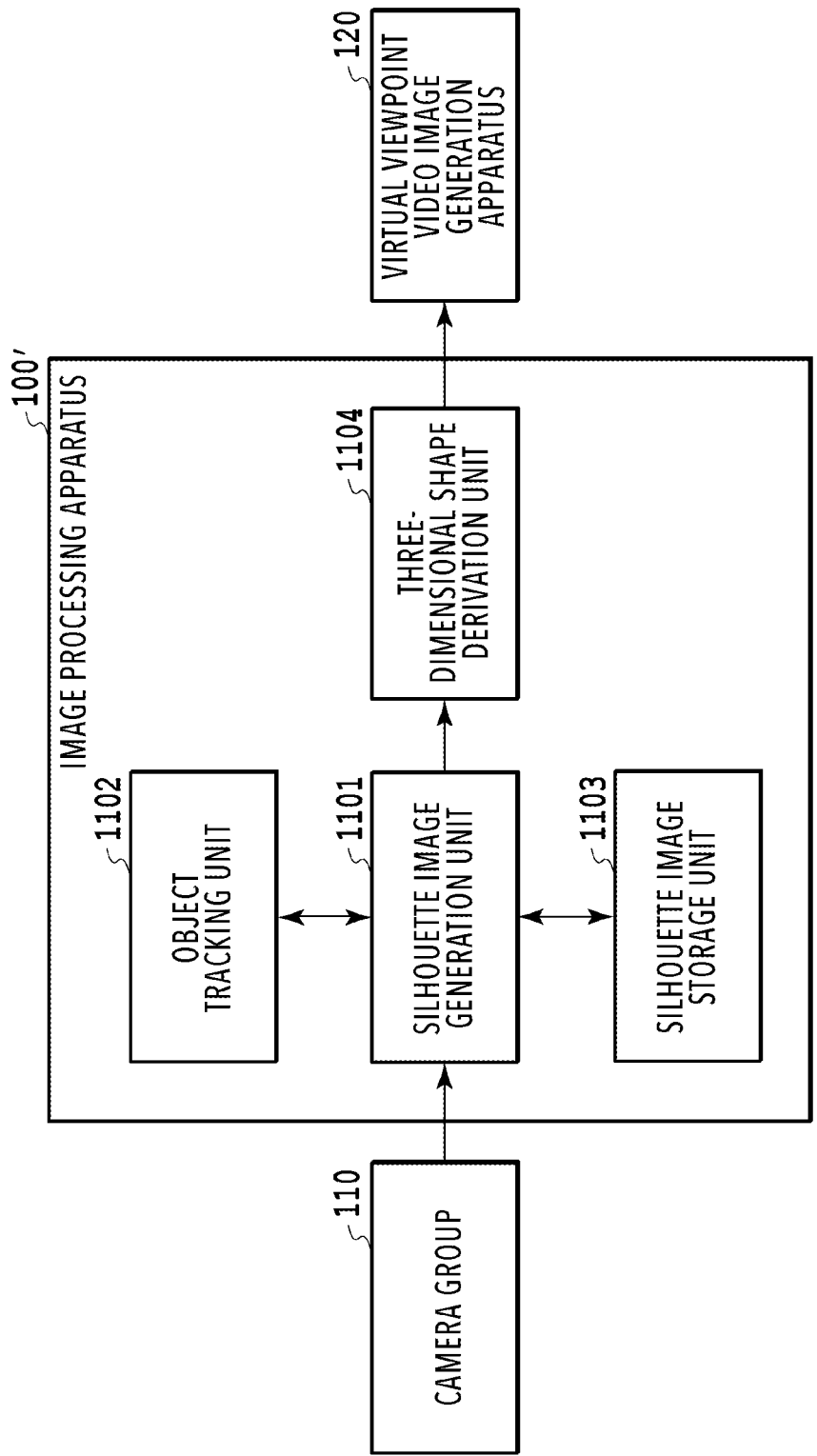
FIG. 11 is a diagram showing an example of a configuration of a virtual viewpoint video image system according to a second embodiment.

FIG. 11 is a diagram showing an example of the configuration of a virtual viewpoint video image system in the present embodiment. The basic configuration is the same as that in the first embodiment. In FIG. 11, within a frame indicating an image processing apparatus 100' of the present embodiment, four function units, that is, a silhouette image generation unit 1101, an object tracking unit 1102, a silhouette image storage unit 1103, and a three-dimensional shape derivation unit 1104 are shown. In the following, each unit is explained.

The silhouette image generation unit 1101 generates a silhouette image of an object, which is the foreground, and texture information thereon based on multi-viewpoint video image data input from the camera group 110. Further, in a case where the difference from the background is the same contents and this continues for a predetermined time, such as a case where there is a change in the illumination condition, the background image is updated. These points are the same as those of the silhouette image generation unit 101 of the first embodiment. In the present embodiment, further in a case where an object that has been moving becomes motionless at the same coordinates for a predetermined time, the silhouette image saved in advance is acquired and supplied to the three-dimensional shape derivation unit 1104.

The object tracking unit 1102 determines whether the object corresponding to the silhouette is the object having been moving (hereinafter, called "moving object") by performing object tracking processing, represented by template matching, for the silhouette image that is input. Specifically, first, the object silhouette detection is performed for the silhouette image generated by the silhouette image generation unit 1101 and a rectangle (hereinafter, called "2D bounding box") circumscribed by an area (silhouette area) representing the detected silhouette is set. Next, the coordinates of the four vertexes of the set 2D bounding box are found as the two-dimensional coordinates of the silhouette area and in a case where the positions thereof change between frames, it is determined that the object is a moving object.

The silhouette image storage unit 1103 performs processing to save the data on the silhouette image in the HDD 203, read the saved data on the silhouette image from the HDD 203, and so on, in accordance with instructions of the silhouette image generation unit 1101.

The three-dimensional shape derivation unit 1104 generates three-dimensional shape data by deriving the three-dimensional shape of the object from the silhouette image received from the silhouette image generation unit 1101 and outputs the three-dimensional shape data to the virtual viewpoint video image generation apparatus 120.

Figure 12:
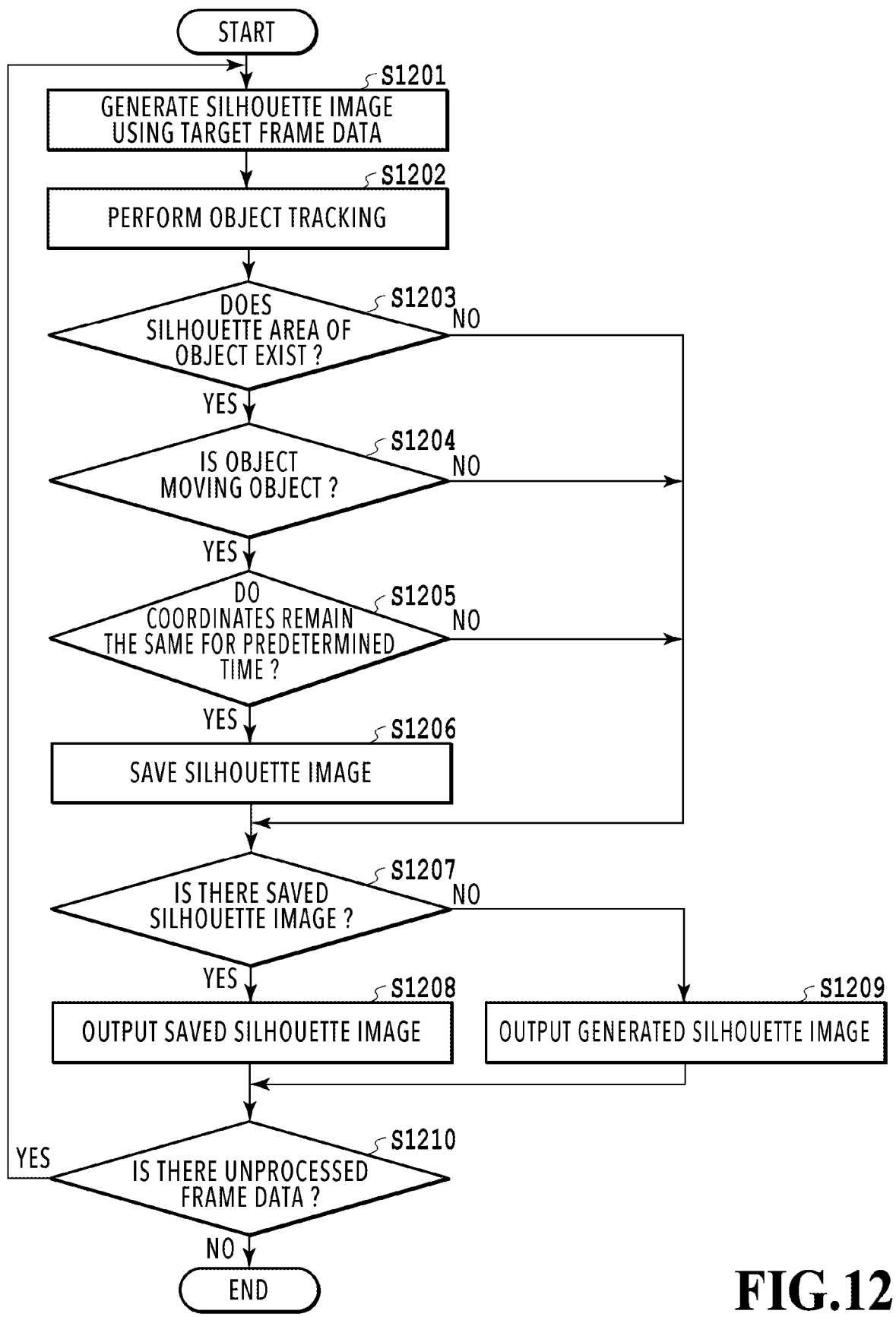
FIG. 12 is a flowchart showing a flow of processing in an image processing apparatus according to the second embodiment.

Following the above, the processing in the image processing apparatus 100' according to the present embodiment is explained with reference to the flowchart in FIG. 12 by taking a case as an example where the frame data at each time shown in FIG. 5A to FIG. 5D described previously is processed. Each piece of processing shown in the flowchart in FIG. 12 is implemented by the CPU 201 reading the control program stored in the HDD 203 onto the main memory 202 and executing the control program. In the following explanation, "S" means a step.

<Time 0:00:10:00>

First, at S1201, the silhouette image generation unit 1101 generates a silhouette image using processing-target frame data. At time 0:00:10:00, the javelin 303 is in the flying state, and therefore, the state is such that there is a difference from the background image. Because of this, the silhouette images 501 to 504 including the silhouette of the javelin 303 in the flying state are generated. The data on the generated silhouette images 501 to 504 is input to the object tracking unit 1102.

Figure 13A:
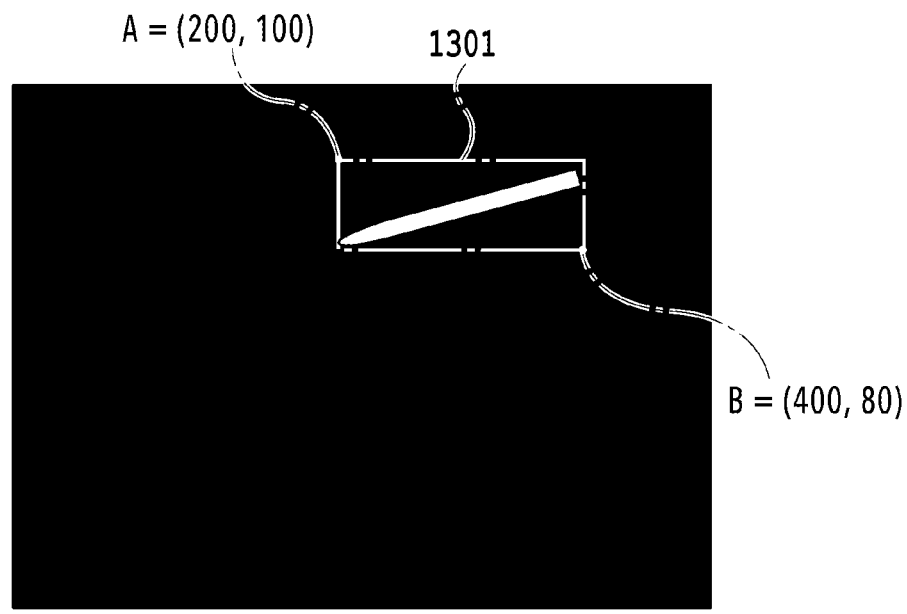
FIG. 13A and FIG. 13B are each a diagram explaining the way object tracking processing is performed.

Next, at S1202, the object tracking unit 1102 performs object tracking processing for the silhouette image generated at S1201. The results of the object tracking processing (presence/absence of the silhouette area, coordinate information on the silhouette area, whether or not the object corresponding to the silhouette area is a moving object) are input to the silhouette image generation unit 1101. FIG. 13A is a diagram explaining the way the object tracking processing for the silhouette image 503 is performed. In FIG. 13A, the area represented by white pixels is the silhouette area representing the two-dimensional shape of the javelin 303 and a rectangular frame 1301 circumscribing the silhouette area indicates the set 2D bounding box. Here, the coordinates of a top-left vertex A of the 2D bounding box 1301 are (200, 100) and the coordinates of a bottom-right vertex B are (400, 80). Here, at the point in time of time 0:00:10:0, no frame data exists before the point in time and the comparison-target 2D bounding box does not exist originally. This is also true with the other silhouette images 501, 502, and 504. Consequently, in this stage in which no past frame exists, it is determined that the object corresponding to the silhouette area in the silhouette images 501 to 504 is not a moving object.

At S1203 to 1205 that follow, the silhouette image generation unit 1101 switches the processing based on the results of the object tracking processing. First, at S1203, the next processing is determined depending on whether the silhouette area of the object exists. In a case where the silhouette area exists within the silhouette image, the processing advances to S1204 and in a case where the silhouette area does not exist, the processing advances to S1207. Next, at S1204, the next processing is determined depending on whether the object corresponding to the silhouette area is a moving object. In a case where the object is a moving object, the processing advances to S1205 and in a case where the object is not a moving object, the processing advances to S1207. Then, at S205, the next processing is determined depending on whether the coordinates of the moving object (that is, the coordinates of the 2D bounding box) remain the same coordinates and do not change for a predetermined time. In a case where the coordinates remain the same coordinates and do not change for a predetermined time, the processing advances to S1206 and in the other cases, the processing advances to S1207. Here, the silhouette area representing the two-dimensional shape of the javelin 303 in the flying state exists, and therefore, the processing advances to S1204 (Yes at S1203) and it is determined that the object is not a moving object, and therefore, the processing advances to S1207 (No at S1204).

At S1207, the silhouette image generation unit 1101 determines whether there is a saved silhouette image. In a case where a silhouette image is saved, the processing advances to S1208 and in a case where no silhouette image is saved, the processing advances to S1209. Here, no saved silhouette image exists, the therefore, the processing advances to S1209.

At S1208, the silhouette image generation unit 1101 acquires the saved silhouette image data by reading it from the HDD 203 via the silhouette image storage unit 1103 and outputs the data to the three-dimensional shape derivation unit 1104. On the other hand, at S1209, the silhouette image generation unit 1101 outputs the data on the silhouette image generated at S201 to the three-dimensional shape derivation unit 1104. Here, the data on the silhouette image generated at S201 is output.

At S1210, whether there is unprocessed frame data is determined. In a case where unprocessed frame data is input, the processing returns to S1201 and the processing is continued. On the other hand, in a case where there is no frame data to be input and the processing for all the frame data has been completed, this processing is terminated. Here, in order to process the frame data at next time 0:00:11:00, the processing returns to S1201.

<Time 0:00:11:00>

At S1201, the silhouette image generation unit 1101 generates a silhouette image using the input target frame data. At time 0:00:11:00, the javelin 303 is in the motionless state of being pierced into the field 330, but in this stage, the background image is not updated and state is such that there is a difference from the background image. Consequently, the silhouette images 511 to 514 including the silhouette of the javelin 303 in the state of being pierced into the field 300 are generated. The data on the generated silhouette images 511 to 514 is input to the object tracking unit 1102.

Figure 13B:
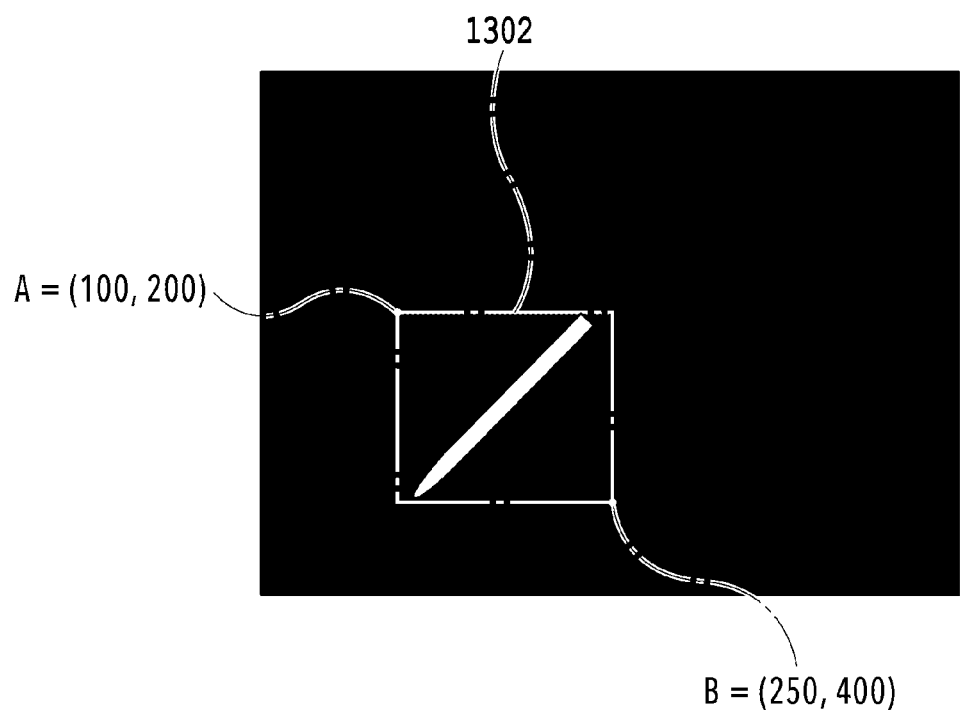

At S1202, the object tracking unit 1102 performs object tracking processing for the silhouette image generated at S1201. Here, also as in the case with time 0:00:10:00 described previously, with each of the silhouette images 511 to 514 being taken as a target, the 2D bounding box circumscribing the silhouette area representing the two-dimensional shape of the javelin 303 in the state of being pierced into the field 300 is set and the vertex coordinates thereof are found. FIG. 13B is a diagram explaining the way the object tracking processing for the silhouette image 513 is performed. In FIG. 13B, the area represented by white pixels is the silhouette area representing the two-dimensional shape of the javelin 303 and a rectangular frame 1302 circumscribing the silhouette area indicates the set 2D bounding box. Here, the coordinates of a top-left vertex A of the 2D bounding box 1302 are (100, 200) and the coordinates of a bottom-right vertex Bare (250, 400). Although explanation is omitted here, the object tracking unit 1102 also performs the same object tracking processing for the silhouette image obtained by the processing for each piece of frame data between time 0:00:10:00 and time 0:00:11:00. In the object tracking processing, a comparison is performed for each frame for the coordinates of the 2D bounding box surrounding the silhouette area of the silhouette image generated for each piece of frame data. That is, the object tracking unit 1102 determines whether the object is moving or motionless by comparing the 2D bounding boxes recognized to relate to the same object by pattern matching. Between time 0:00:10:00 and time 0:00:11:00, as will be understood from FIG. 13A and FIG. 13B described above, the position coordinates of the 2D bounding box change every moment, and therefore, it is determined that the object is a moving object that moves between frames. The results of the object tracking processing thus obtained are input to the silhouette image generation unit 1101.

At S1203 to 1205 that follow, as described previously, the silhouette image generation unit 1101 switches the processing based on the results of the object tracking processing. Here, the silhouette area representing the two-dimensional shape of the javelin 303 in the state of being pierced into the field 300 exists, and therefore, the processing advances to S1204 (Yes at S1203) and it is determined that the object is a moving object, and therefore, the processing advances to S1205 (Yes at S1204).

At S1205, the silhouette image generation unit 1101 determines whether the coordinates of the 2D bounding box surrounding the silhouette area of the moving object do not change for a predetermined time based on the results of the object tracking processing. The meaning of this determination processing is to check whether the moving object remains at the same position and is motionless during a period corresponding to a predetermined number of frames. The predetermined time may be an arbitrary time, but here, the predetermined time is taken as five seconds as in the case with S604 of the first embodiment. Here, the coordinates of the 2D bounding box 1302 are different from the coordinates of the 2D bounding box 1301 at time 0:00:10:00 one second before, and therefore, it is not determined that the coordinates do not change for the predetermined time (No at S1205). Because of this, the processing advances to S1207.

At S1207, the silhouette image generation unit 1101 determines whether there is a saved silhouette image. Here, no saved silhouette image exists, and therefore, the processing advances to S1209. Then, at S1209, the silhouette image generation unit 1101 outputs the data on the silhouette image generated at S1201 to the three-dimensional shape derivation unit 104. Then, by the determination processing at S1210, the processing returns to S1201 in order to process the frame data at next time 0:00:16:00.
<Time 0:00:16:00>

At S1201, the silhouette image generation unit 1101 generates a silhouette image using the input target frame data. At time 0:00:16:00, the javelin 303 is in the motionless state of being pierced into the field 300, but in this stage, the background image is not updated yet and the state is such that there is a difference from the background image. Consequently, the silhouette images 521 to 524 including the silhouette of the javelin 303 in the state of being pierced into the field 300 are generated. The data on the generated silhouette images 521 to 541 is input to the object tracking unit 1102.

At S1202, the object tracking unit 1102 performs object tracking processing for the silhouette image generated at S1201. Also here, as in the case with time 0:00:11:00 described previously, with each of the silhouette images 521 to 524 being taken as a target, the 2D bounding box circumscribing the silhouette area representing the two-dimensional shape of the javelin 303 in the state of being pierced into field 300 is set and the vertex coordinates thereof are found (see FIG. 13B described previously). Further, in this stage, although the motionless state has continued for five seconds, it is possible to grasp that the object was moving in the past frame by tracking, and therefore, it is determined that the object is a moving object. The results of the object tracking processing thus obtained are input to the silhouette image generation unit 1101.

At S1203 to S1205 that follow, as described previously, the silhouette image generation unit 1101 switches the processing based on the results of the object tracking processing. Here, the silhouette area representing the two-dimensional shape of the javelin 303 in the state of being pierced into the field 300 exists, and therefore, the processing advances to S1204 (Yes at S1203) and it is determined that the object is a moving object, and therefore, the processing advances to S1205 (Yes at S1204).

At S1205, the silhouette image generation unit 1101 determines whether the coordinates of the 2D bounding box surrounding the silhouette area of the moving object remain the same coordinates and do not change for a predetermined time based on the results of the object tracking processing. Here, the coordinates of the 2D bounding box match with the coordinates of the 2D bounding box at time 0:00:11:00 five second before, and therefore, it is determined that the coordinates do not change for a predetermined time (Yes at S1205). Because of this, the processing advances to S1206.

At S1206, the silhouette image storage unit 1103 saves the data on the silhouette image generated at S1201 in the HDD 203, for which it has been determined that the 2D bounding box remains at the same coordinates for a predetermined time and there is no change.

At S1207, the silhouette image generation unit 1101 determines whether there is a saved silhouette image. Here, the saved silhouette image exists, and therefore, the processing advances to S1208. Then, at S1208, the silhouette image generation unit 1101 acquires the data on the silhouette image saved at S1206 via the silhouette image storage unit 1103 and outputs the data to the three-dimensional shape derivation unit 1104. Then, by the determination processing at S1210, the processing returns to S1201 in order to process the frame data at next time 0:00:21:00.
<Time 0:00:21:00>

At S1201, the silhouette image generation unit 1101 generates a silhouette image using the input target frame data. At time 0:00:21:00, the state is such that ten seconds have elapsed with the javelin 303 being pierced into the field 303 and motionless and in this stage, the background image has been updated. That is, the state is such that there is no difference from the background image. Consequently, the silhouette images 531 to 534 not including the silhouette of the javelin 303 in the state of being pierced into the field 300 are generated. The data on the generated silhouette images 531 to 534 is input to the object tracking unit 1102.

At S1202, the object tracking unit 1102 performs object tracking processing for the silhouette image generated at S1201. Here, no silhouette area exists in the silhouette images 531 to 534, and therefore, it is not possible to set the 2D bounding box and the calculation of the vertex coordinates thereof is not performed. Then, the results of the object tracking processing are input to the silhouette image generation unit 1101.

At S1203 to S1205 that follow, as described previously, the silhouette image generation unit 1101 switches the processing based on the results of the object tracking processing. Here, the silhouette area representing the two-dimensional shape of the javelin 303 does not exist (No at S1203), and therefore, the processing advances to S1207.

At S1207, the silhouette image generation unit 1101 determines whether there is a saved silhouette image. Here, the silhouette image saved by the processing for the frame data at time 0:00:16:00 exists, and therefore, the processing advances to S208. Then, at S1208, the silhouette image generation unit 1101 acquires the data on the saved silhouette image via the silhouette image storage unit 1103 and outputs the data to the three-dimensional shape derivation unit 1104. Then, in the determination processing at S1210, them is no unprocessed frame data, and therefore, the processing terminates.

As described above, the silhouette area within the generated silhouette image is tracked and in a case where the position of the silhouette area does not change (the silhouette area is located at the same coordinates) for a predetermined time, the silhouette image at that point in time is stored. Then, until the object having terminated movement and become motionless moves again, the stored silhouette image is read and output. Due to this, even in a case where the background image is updated, it is made possible to continue the supply of the silhouette image of the object. The present embodiment is more adaptive in the image capturing scene in which the number of moving objects is small. The reason is that in a case where the number of moving objects is large, the overlap between objects becomes more likely to occur accordingly, and therefore, the occlusion area becomes more likely to occur and the shape accuracy of the obtained three-dimensional model is reduced.

As above, according to the present embodiment, in a case where a moving object remains motionless for a predetermined time, even though the silhouette image including the silhouette of the object is not generated due to the updating of the background image, it is possible to continue the supply of the silhouette image in the motionless state. Then, it is possible for the three-dimensional shape derivation unit 1104 to generate three-dimensional shape data including the voxel group representing the shape of the moving object in the motionless state using the data on the supplied silhouette image and supply the three-dimensional shape data to the virtual viewpoint video image generation apparatus 120. As a result of that, as in the first embodiment, it is possible for the virtual viewpoint video image generation apparatus 120 to generate a virtual viewpoint video image in which a motionless object exists.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present disclosure, it is possible to prevent an object that should exist in a virtual viewpoint video image from disappearing suddenly.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-075362, filed Apr. 11, 2019 which is hereby incorporated by reference wherein in its entirety.

What is claimed is:

1. An image processing apparatus comprising:
one or more memories storing instructions; and
one or more processors executing the instructions to:
generate three-dimensional shape data of a moving object based on a plurality of images captured from a plurality of viewpoints; and
output the generated three-dimensional shape data to an apparatus that generates a virtual viewpoint image,
wherein, in a case where the moving object becomes motionless during a part of an image capturing period, three-dimensional shape data of the moving object which is generated based on a plurality of images that are captured from the plurality of viewpoints before the moving object becomes motionless is output to the apparatus that generates the virtual viewpoint image.

2. The image processing apparatus according to claim 1, wherein
the one or more processors further execute the instructions to generate silhouette images using frames of the images, which correspond to the plurality of viewpoints, and
the three-dimensional shape data is generated by deriving a three-dimensional shape of the moving object from generated silhouette images corresponding to the plurality of viewpoints.

3. The image processing apparatus according to claim 2, wherein
the one or more processors further execute the instructions to save the three-dimensional shape data of the moving object which is generated based on a plurality of images which are captured from the plurality of viewpoints before the moving object becomes motionless.

4. The image processing apparatus according to claim 3, wherein
the one or more processors further execute the instructions to specify coordinates on a three-dimensional space of an element group representing the three-dimensional shape of the moving object and
in a case where the specified coordinates remain the same coordinates for a predetermined time, three-dimensional shape data corresponding to the specified coordinates is saved.

5. The image processing apparatus according to claim 3, wherein
in a case where the three-dimensional shape data is saved, the saved three-dimensional shape data is output to the apparatus in place of three-dimensional shape data generated from a derived three-dimensional shape.

6. The image processing apparatus according to claim 3, wherein
in a case where it is not possible to derive a three-dimensional shape of the moving object from the silhouette image, the saved three-dimensional shape data is output to the apparatus.

7. The image processing apparatus according to claim 3, wherein the one or more processors further execute the instructions to receive user instructions to terminate outputting of the three-dimensional shape data which is generated based on a plurality of images that are captured from the plurality of viewpoints before the moving object becomes motionless.

8. The image processing apparatus according to claim 2, wherein
the silhouette image is generated based on an inter-frame difference method or a background difference method of updating a background in a case where a difference between a frame configuring the image and the background is identical contents and continues for a predetermined time.

9. The image processing apparatus according to claim 2, wherein
the one or more processors further execute the instructions to save the silhouette images of the moving object before the moving object becomes motionless,
and
the three-dimensional shape data is generated by deriving a three-dimensional shape of the moving object by using the saved silhouette images.

10. The image processing apparatus according to claim 9, wherein
in a case where a position of a silhouette area in a silhouette image does not change for a predetermined time, the silhouette image is saved.

11. The image processing apparatus according to claim 9, wherein
in a case where a silhouette area of the moving object is not included in the generated silhouette images, the saved silhouette image is used for generating the three-dimensional shape data of the moving object.

12. The image processing apparatus according to claim 1, wherein
the moving object is an equipment used in a track and field event.

13. A system comprising:
one or more memories storing instructions; and
one or more processors executing the instructions to:
generate three-dimensional shape data of a moving object based on a plurality of images captured from a plurality of viewpoints; and
generate a virtual viewpoint image based on the generated three-dimensional shape data, wherein,
in a case where the moving object becomes motionless during a part of an image capturing period, the virtual viewpoint image is generated based on three-dimensional shape data of the moving object which is generated based on a plurality of images that are captured from the plurality of viewpoints before the moving object becomes motionless.

14. An image processing apparatus comprising:
one or more memories storing instructions; and
one or more processors executing the instructions to:
acquire three-dimensional shape data of a moving object, which is generated based a plurality of images captured from a plurality of viewpoints; and
generate a virtual viewpoint image based on the acquired three-dimensional shape data, wherein,
in a case where the moving object becomes motionless during a part of an image capturing period, three-dimensional shape data of the moving object which is generated based on a plurality of images that are captured from the plurality of viewpoints before the moving object becomes motionless is acquired.

15. The image processing apparatus according to claim 14, wherein
the one or more processors further execute the instructions to save, in a case where the moving object becomes motionless, three-dimensional shape data of the moving object, and
generate a virtual viewpoint image based on the saved three-dimensional shape data.

16. The image processing apparatus according to claim 15, wherein
the one or more processors further execute the instructions to specify coordinates on a three-dimensional space of an element group representing the three-dimensional shape of the moving object, and
in a case where the specified coordinates remain the same coordinates for a predetermined time, three-dimensional shape data corresponding to the specified coordinates.

17. A control method of an image processing apparatus, the control method comprising the steps of:
generating three-dimensional shape data of a moving object based on a plurality of images captured from a plurality of viewpoints; and
outputting the generated three-dimensional shape data to an apparatus that generates a virtual viewpoint image, wherein,
in a case where the moving object becomes motionless during a part of an image capturing period in the generating step, three-dimensional shape data of the moving object which is generated based on a plurality of images that are captured from the plurality of viewpoints before the moving object becomes motionless is output to the apparatus that generates the virtual viewpoint image.

18. An image generation method, comprising:
saving, in a case where a moving object becomes motionless during a part of an image capturing period, three-dimensional shape data of the moving object which is generated based on a plurality of images that are captured from the plurality of viewpoints before the moving object becomes motionless; and
generating a virtual viewpoint image by using the saved three-dimensional shape data.

19. A non-transitory computer readable storage medium storing a program for causing a computer to perform a control method of an image processing apparatus, the control method comprising:
generating three-dimensional shape data of a moving object based on a plurality of images captured from a plurality of viewpoints; and
outputting the generated three-dimensional shape data to an apparatus that generates a virtual viewpoint image, wherein,
in a case where the moving object becomes motionless during a part of an image capturing period in the generating step, three-dimensional shape data of the moving object which is generated based on a plurality of images that are captured from the plurality of viewpoints before the moving object becomes motionless is output to the apparatus that generates the virtual viewpoint image.

20. A non-transitory computer readable storage medium storing a program for causing a computer to perform an image generation method, comprising:
saving, in a case where a moving object becomes motionless during a part of an image capturing period, three-dimensional shape data of the moving object which is generated based on a plurality of images that are captured from the plurality of viewpoints before the moving object becomes motionless; and generating a virtual viewpoint image by using the saved three-dimensional shape data.

\* \* \* \* \*